(12) United States Patent  
Hahn

(10) Patent No.: US 12,532,309 B2  
(45) Date of Patent: Jan. 20, 2026

(54) METHOD AND DEVICE FOR SIDELINK GROUPCAST COMMUNICATION

(71) Applicants: Hyundai Motor Company, Seoul (KR); Kia Corporation, Seoul (KR)

(72) Inventor: Gene Back Hahn, Gyeonggi-do (KR)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 816 days.

(21) Appl. No.: 17/432,383

(22) PCT Filed: Feb. 5, 2020

(86) PCT No.: PCT/KR2020/001668  
§ 371 (c)(1),  
(2) Date: Aug. 19, 2021

(87) PCT Pub. No.: WO2020/171434  
PCT Pub. Date: Aug. 27, 2020

(65) Prior Publication Data  
US 2022/0201698 A1    Jun. 23, 2022

Related U.S. Application Data

(60) Provisional application No. 62/820,485, filed on Mar. 19, 2019, provisional application No. 62/811,088, filed on Feb. 27, 2019, provisional application No. 62/809,345, filed on Feb. 22, 2019.

(51) Int. Cl.  
*H04W 72/121* (2023.01)  
*H04W 4/40* (2018.01)  
*H04W 76/10* (2018.01)

(52) U.S. Cl.  
CPC .......... *H04W 72/121* (2013.01); *H04W 4/40* (2018.02); *H04W 76/10* (2018.02)

(58) Field of Classification Search  
None  
See application file for complete search history.

(56) References Cited

U.S. PATENT DOCUMENTS

2012/0302240 A1* 11/2012 Tamaki ............... H04W 72/121  
                                                            455/436  
2018/0019794 A1*  1/2018 Kowalski ............... H04L 5/003

FOREIGN PATENT DOCUMENTS

WO    WO-2018202798 A1 * 11/2018 ......... H04B 7/15507

OTHER PUBLICATIONS

R2-1813735_Oct. 8-12, 2018 (Year: 2018).*

(Continued)

*Primary Examiner* — Jinsong Hu  
*Assistant Examiner* — Alexander J Yi  
(74) *Attorney, Agent, or Firm* — Fox Rothschild LLP

(57) ABSTRACT

Disclosed are a method and a device for sidelink groupcast communication. An operation method of an SGH comprises the steps of: determining a TM for communication with one or more SGMs belonging to an SG group; transmitting a message including the TM to a base station connected to the SGH; receiving, from the base station, configuration information of sidelink resources allocated according to the TM; and performing communication with the one or more SGMs by using the sidelink resources allocated by the base station. Therefore, communication system performance can be improved.

7 Claims, 12 Drawing Sheets

(56) References Cited

OTHER PUBLICATIONS

R2-1813735, "Some consideration of platooning", CATT, 3GPP TSG-RAN WG2 Meeting #103bis, Chengdu, China, Oct. 8-12, 2018, 3 pages.
CATT, "Some consideration of platooning," R2-1813735, 3GPP TSG RAN WG2 #103b is, Chengdu, China, Sep. 28, 2018, 3 pages.
Ericsson, "Layer-2 implications of Platoon header," R2-1901664, 3GPP TSG RAN WG2 #105, Athens, Greece, Feb. 14, 2019, 3 pages.
Fraunhofer Hhi, "Evaluation of NR V2X Mode 2 Resource Allocation," R1-190 1844, 3GPP TSG RAN WG1 #96, Athens, Greece, Feb. 15, 2019, 6 pages.
Huawei, "Support of unicast and groupcast for eV2X," R2-1801903, 3GPP TSG RAN WG2 #101, Athens, Gerece, Feb. 15, 2018, 20 pages.

\* cited by examiner

METHOD AND DEVICE FOR SIDELINK GROUPCAST COMMUNICATION

CROSS-REFERENCES TO RELATED APPLICATIONS

This application is a U.S. national phase application, pursuant to 35 U.S.C. § 371, of PCT/KR2020/001668, filed Feb. 5, 2020, designating the United States, which claims priority and benefit of U.S. Provisional Application No. 62/820,485, filed Mar. 19, 2019, U.S. Provisional Application 62/811,088, filed Feb. 27, 2019, and U.S. Provisional Application 62/809,345, filed Feb. 22, 2019. The entire contents of these applications are incorporated herein by reference in their entirety.

BACKGROUND

(a) Technical Field

The present disclosure relates to a sidelink communication technique, more particularly, to a technique for configuring sidelink communication between communication nodes for supporting a groupcast service.

(b) Description of the Related Art

A fifth-generation (5G) communication system (e.g., New Radio (NR) communication system) which uses a frequency band higher than a frequency band of a fourth-generation (4G) communication system (e.g., Long Term Evolution (LTE) communication system or LTE-Advanced (LTE-A) communication system) as well as the frequency band of the 4G communication system has been considered for processing of wireless data. The 5G communication system can support Enhanced Mobile Broadband (eMBB) communications, Ultra-Reliable and Low-Latency communications (URLLC), massive Machine Type Communications (mMTC), and the like.

The 4G communication system and the 5G communication system can support Vehicle-to-Everything (V2X) communications. The V2X communications supported in a cellular communication system, such as the 4G communication system, the 5G communication system, and the like, may be referred to as "Cellular-V2X (C-V2X) communications." The V2X communications (e.g., C-V2X communications) may include Vehicle-to-Vehicle (V2V) communications, Vehicle-to-Infrastructure (V2I) communications, Vehicle-to-Pedestrian (V2P) communication, Vehicle-to-Network (V2N) communication, and the like.

In the cellular communication systems, the V2X communications (e.g., C-V2X communications) may be performed based on sidelink communication technologies (e.g., Proximity-based Services (ProSe) communication technology, Device-to-Device (D2D) communication technology, or the like). For example, sidelink channels for vehicles participating in V2V communications can be established, and communications between the vehicles can be performed using the sidelink channels.

Meanwhile, vehicles (e.g., communication nodes located in the vehicles) participating in platooning may communicate with a base station (e.g., road side unit (RSU)). In addition, sidelink communication may be performed between the vehicles participating in the platooning. One vehicle among the vehicles participating in the platooning may be referred to as a platoon leader (PL), and the PL may mean a terminal located in the corresponding vehicle. Among the vehicles participating in the platooning, vehicles other than the PL may be referred to as platoon members (PMs), and the PM may mean a terminal located in the corresponding vehicle.

The vehicles participating in the platooning may perform sidelink groupcast communication. In this case, the PL may be referred to as a sidelink groupcast header (SGH), and the PMs may be referred to as sidelink groupcast members (SGMs). The SGH (e.g., PL) may be connected to the base station and may control the sidelink groupcast communication. For example, communication between the SGH and the SGM and communication between the SGMs may be performed under controls of the SGH. However, since a protocol for sidelink groupcast communication is not explicitly defined, there is a problem in that sidelink groupcast communication (e.g., scheduling operation of sidelink resources) cannot be efficiently performed.

SUMMARY

An objective of the present disclosure is to provide a communication configuration method for supporting a sidelink groupcast service.

An operation method of a sidelink groupcast header (SGH), according to a first exemplary embodiment of the present disclosure, may comprise: determining a transmission mode (TM) for communication with one or more sidelink groupcast members (SGMs) belonging to the SG group; transmitting a message including the TM to a base station connected to the SGH; receiving configuration information of sidelink resources allocated according to the TM from the base station; and performing communication with the one or more SGMs using the sidelink resources allocated by the base station.

The operation method may further comprise receiving a group radio network temporary identifier (RNTI) configured for the SG group from the base station after transmitting the message, wherein the group RNTI is used for sidelink groupcast communication between the SGH and the one or more SGMs belonging to the SG group.

The TM determined by the SGH may be one TM from TMs #1 to #4, the TM #1 may indicate that the SGH autonomously selects sidelink resources, the TM #2 may indicate that the SGH supports selection of sidelink resources for the one or more SGMs, the TM #3 may indicate that the SGH uses sidelink resources configured by a configured grant (CG), and the TM #4 may indicate that the SGH performs a scheduling operation for communication with the one or more SGMs.

The message may be a sidelink user equipment (UE) information message, the sidelink UE information message may include a sidelink service type, information indicating that the SGH operates as a platooning leader (PL), and an identifier of the SGH, and the sidelink service type may indicate at least one of a broadcast service, a multicast service, a groupcast service, and a unicast service.

In a connection establishment procedure between the SGH and the one or more SGMs, a group RNTI, capability information of the SGH, and capability information of the one or more SGMs may be exchanged.

The operation method may further comprise reporting information on the one or more SGMs included in the SG group to the base station.

The information on the one or more SGMs may be reported according to a reporting periodicity indicated by the message or when members of the SG group are changed.

The information on the one or more SGMs may include information indicating a number of the one or more SGMs and an identifier of each of the one or more SGMs.

An operation method of a communication node, according to a second exemplary embodiment of the present disclosure for achieving the objective, may comprise: transmitting a first message including information indicating that the communication node supports a sidelink groupcast header (SGH) function to a first SGH managing a first sidelink groupcast (SG) group; when the communication node is determined as a new SGH of the first SG group, receiving a second message including configuration information for sidelink groupcast communication supported by the communication node from a base station connected to the first SGH; and performing an update operation of the sidelink groupcast communication with one or more sidelink groupcast members (SGMs) belonging to the first SG group based on the configuration information.

The performing of the update operation may comprise: transmitting information indicating that the communication node is configured as the new SGH to the one or more SGMs; receiving, from the one or more SGMs, response information indicating whether to join the first SG group managed by the communication node; and reconfiguring the first SG group based on the response information.

The configuration information may include a new group radio network temporary identifier (RNTI) for the first SG group reconfigured by the communication node, a new identifier, and a new reporting periodicity.

The operation method may further comprise transmitting, to the base station, a number and identifiers of one or more SGMs belonging to the first SG group managed by the communication node according to the new reporting periodicity.

The first message may be transmitted when information indicating that the first SGH does not perform the SGH function is received from the first SGH.

Information indicating that the communication node is determined as the new SGH of the first SG group may be transmitted from the first SGH to the base station.

The communication node may be one SGM among the one or more SGMs or a second SGH managing a second SG group.

An operation method of a SGH, according to a third exemplary embodiment of the present disclosure for achieving the objective, may comprise: receiving, from a first sidelink groupcast member (SGM) among a plurality of SGMs belonging to the SG group, information indicating that the first SGM leaves the SG group; when the first SGM is determined to leave the SG group, transmitting a message indicating that the SG group is changed to a base station connected to the SGH; receiving configuration information of a changed SG group from the base station; and performing an update operation of sidelink groupcast communication with other SGMs except the first SGM among the plurality of SGMs based on the configuration information.

The operation method may further comprise: when the first SGM is determined to leave the SG group, transmitting information indicating that the first SGM is allowed to leave the SG group to the first SGM.

The message may include an identifier of the first SGM and information indicating a cause of the change of the SG group.

The configuration information may include a new group radio network temporary identifier (RNTI) for the changed SG group, a new identifier, and a new reporting periodicity.

The operation method may further comprise transmitting, to the base station, a number and identifiers of one or more SGMs belonging to the changed SG group according to the new reporting periodicity.

According to the exemplary embodiments of the present disclosure, a platform leader (PL) may inform a base station of a vehicle-to-everything (V2X) transmission mode (TM) supported by the PL. The base station may generate allocation information of sidelink resources according to the V2X TM supported by the PL, and may transmit the allocation information of sidelink resources to the PL. The PL may perform sidelink communication (e.g., platooning communication) with platoon members (PMs) using the allocation information of sidelink resources according to the V2X TM. Since the base station knows the V2X TM supported by the PL, scheduling operations of sidelink resources can be efficiently performed.

In addition, the PL may transmit information on the PM(s) (e.g., number of PM(s), identifiers of PM(s)) belonging to a platooning group (e.g., sidelink groupcast group) to the base station. The base station may allocate sidelink resources based on the information on the PM(s) belonging to the platooning group. Therefore, the scheduling operations of the sidelink resources can be efficiently performed.

In addition, when the PL and PMs belonging to the platooning group are changed, the PL may inform the base station and/or the PMs of information on the change of the platooning group. According to the change of the platooning group, configuration information of the platooning group may be updated. Therefore, the performance of the communication system can be improved.

DETAILED DESCRIPTION

Figure 1:
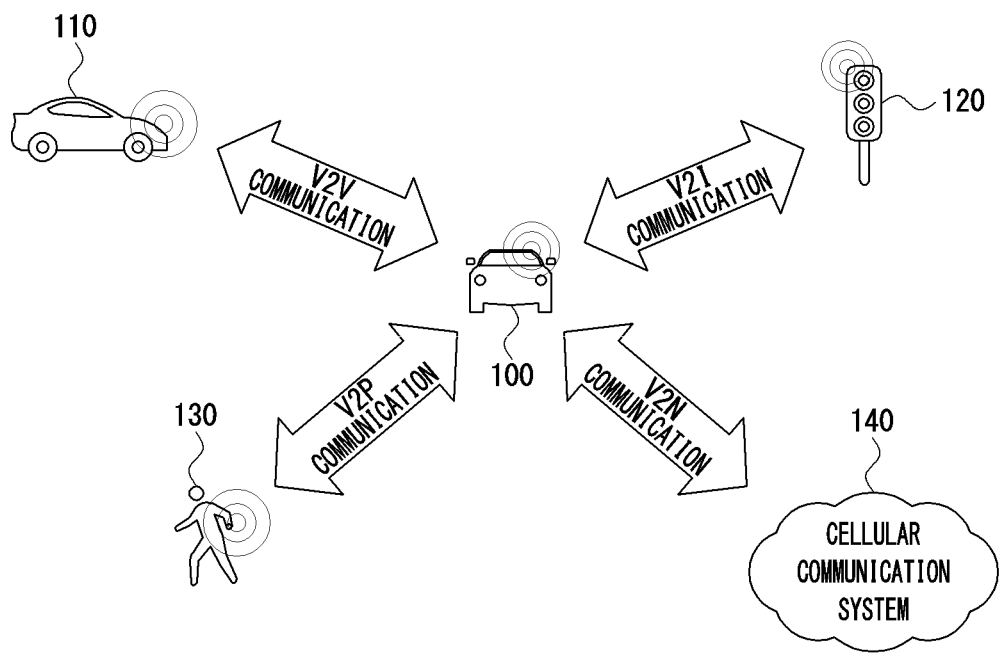
FIG. 1 is a conceptual diagram illustrating V2X communication scenarios.

While the present invention is susceptible to various modifications and alternative forms, specific embodiments are shown by way of example in the drawings and described in detail. It should be understood, however, that the description is not intended to limit the present invention to the specific embodiments, but, on the contrary, the present invention is to cover all modifications, equivalents, and alternatives that fall within the spirit and scope of the present invention.

Although the terms "first," "second," etc. may be used herein in reference to various elements, such elements should not be construed as limited by these terms. These terms are only used to distinguish one element from another. For example, a first element could be termed a second element, and a second element could be termed a first element, without departing from the scope of the present invention. The term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directed coupled" to another element, there are no intervening elements.

The terminology used herein is for the purpose of describing particular embodiments only and is not intended to be limiting of embodiments of the present invention. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, parts, and/or combinations thereof, but do not preclude the presence or addition of one or more other features, integers, steps, operations, elements, parts, and/or combinations thereof.

Unless otherwise defined, all terms (including technical and scientific terms) used herein have the same meaning as commonly understood by those of ordinary skill in the art to which the present invention pertains. It will be further understood that terms defined in commonly used dictionaries should be interpreted as having a meaning that is consistent with their meaning in the context of the related art and will not be interpreted in an idealized or overly formal sense unless expressly so defined herein.

Hereinafter, preferred exemplary embodiments of the present invention will be described in detail with reference to the accompanying drawings. In describing the present invention, to facilitate the entire understanding, like numbers refer to like elements throughout the description of the figures and the repetitive description thereof will be omitted.

FIG. 1 is a conceptual diagram illustrating V2X communication scenarios.

As shown in FIG. 1, the V2X communications may include Vehicle-to-Vehicle (V2V) communications, Vehicle-to-Infrastructure (V2I) communications, Vehicle-to-Pedestrian (V2P) communications, Vehicle-to-Network (V2N) communications, and the like. The V2X communications may be supported by a cellular communication system (e.g., a cellular communication system 140), and the V2X communications supported by the cellular communication system 140 may be referred to as "Cellular-V2X (C-V2X) communications." Here, the cellular communication system 140 may include the 4G communication system (e.g., LTE communication system or LTE-A communication system), the 5G communication system (e.g., NR communication system), and the like.

The V2V communications may include communications between a first vehicle 100 (e.g., a communication node located in the vehicle 100) and a second vehicle 110 (e.g., a communication node located in the vehicle 110). Various driving information such as velocity, heading, time, position, and the like may be exchanged between the vehicles 100 and 110 through the V2V communications. For example, autonomous driving (e.g., platooning) may be supported based on the driving information exchanged through the V2V communications. The V2V communications supported in the cellular communication system 140 may be performed based on "sidelink" communication technologies (e.g., ProSe and D2D communication technologies, and the like). In this case, the communications between the vehicles 100 and 110 may be performed using at least one sidelink channel established between the vehicles 100 and 110.

The V2I communications may include communications between the first vehicle 100 (e.g., the communication node located in the vehicle 100) and an infrastructure (e.g., road side unit (RSU)) 120 located on a roadside. The infrastructure 120 may also include a traffic light or a street light which is located on the roadside. For example, when the V2I communications are performed, the communications may be performed between the communication node located in the first vehicle 100 and a communication node located in a traffic light. Traffic information, driving information, and the like may be exchanged between the first vehicle 100 and the infrastructure 120 through the V2I communications. The V2I communications supported in the cellular communication system 140 may also be performed based on sidelink communication technologies (e.g., ProSe and D2D communication technologies, and the like). In this case, the communications between the vehicle 100 and the infrastructure 120 may be performed using at least one sidelink channel established between the vehicle 100 and the infrastructure 120.

The V2P communications may include communications between the first vehicle 100 (e.g., the communication node located in the vehicle 100) and a person 130 (e.g., a communication node carried by the person 130). The driving information of the first vehicle 100 and movement information of the person 130 such as velocity, heading, time, position, and the like may be exchanged between the vehicle 100 and the person 130 through the V2P communications. The communication node located in the vehicle 100 or the communication node carried by the person 130 may generate an alarm indicating a danger by judging a dangerous situation based on the obtained driving information and movement information. The V2P communications supported in the cellular communication system 140 may be performed based on sidelink communication technologies (e.g., ProSe and D2D communication technologies, and the like). In this case, the communications between the communication node located in the vehicle 100 and the communication node carried by the person 130 may be performed using at least one sidelink channel established between the communication nodes.

The V2N communications may be communications between the first vehicle 100 (e.g., the communication node located in the vehicle 100) and a server connected through the cellular communication system 140. The V2N communications may be performed based on the 4G communication technology (e.g., LTE or LTE-A) or the 5G communication technology (e.g., NR). Also, the V2N communications may be performed based on a Wireless Access in Vehicular Environments (WAVE) communication technology or a Wireless Local Area Network (WLAN) communication technology which is defined in Institute of Electrical and Electronics Engineers (IEEE) 802.11, or a Wireless Personal Area Network (WPAN) communication technology defined in IEEE 802.15.

Meanwhile, the cellular communication system 140 supporting the V2X communications may be configured as follows.

Figure 2:
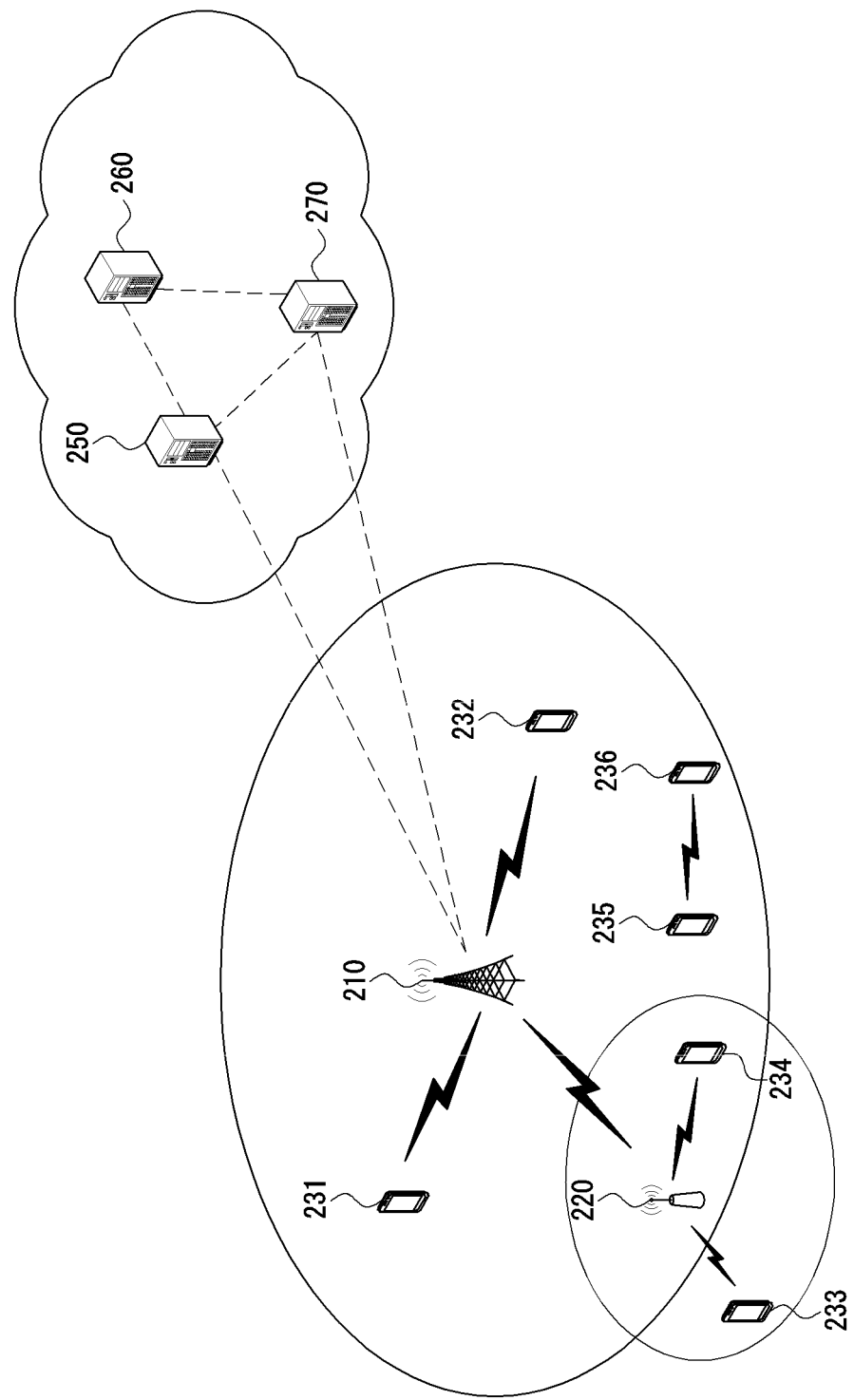
FIG. 2 is a conceptual diagram illustrating an exemplary embodiment of a cellular communication system.

FIG. 2 is a conceptual diagram illustrating an exemplary embodiment of a cellular communication system.

As shown in FIG. 2, a cellular communication system may include an access network, a core network, and the like. The access network may include a base station 210, a relay 220, User Equipments (UEs) 231 through 236, and the like. The UEs 231 through 236 may include communication nodes located in the vehicles 100 and 110 of FIG. 1, the communication node located in the infrastructure 120 of FIG. 1, the communication node carried by the person 130 of FIG. 1, and the like. When the cellular communication system supports the 4G communication technology, the core network may include a serving gateway (S-GW) 250, a packet data network (PDN) gateway (P-GW) 260, a mobility management entity (MME) 270, and the like.

When the cellular communication system supports the 5G communication technology, the core network may include a user plane function (UPF) 250, a session management function (SMF) 260, an access and mobility management function (AMF) 270, and the like. Alternatively, when the cellular communication system operates in a Non-Stand Alone (NSA) mode, the core network constituted by the S-GW 250, the P-GW 260, and the MME 270 may support the 5G communication technology as well as the 4G communication technology, and the core network constituted by the UPF 250, the SMF 260, and the AMF 270 may support the 4G communication technology as well as the 5G communication technology.

Also, when the cellular communication system supports a network slicing technique, the core network may be divided into a plurality of logical network slices. For example, a network slice supporting V2X communications (e.g., a V2V network slice, a V2I network slice, a V2P network slice, a V2N network slice, etc.) may be configured, and the V2X communications may be supported through the V2X network slice configured in the core network.

The communication nodes (e.g., base station, relay, UE, S-GW, P-GW, MME, UPF, SMF, AMF, etc.) comprising the cellular communication system may perform communications by using at least one communication technology among a code division multiple access (CDMA) technology, a time division multiple access (TDMA) technology, a frequency division multiple access (FDMA) technology, an orthogonal frequency division multiplexing (OFDM) technology, a filtered OFDM technology, an orthogonal frequency division multiple access (OFDMA) technology, a single carrier FDMA (SC-FDMA) technology, a non-orthogonal multiple access (NOMA) technology, a generalized frequency division multiplexing (GFDM) technology, a filter bank multi-carrier (FBMC) technology, a universal filtered multi-carrier (UFMC) technology, and a space division multiple access (SDMA) technology.

The communication nodes (e.g., base station, relay, UE, S-GW, P-GW, MME, UPF, SMF, AMF, etc.) comprising the cellular communication system may be configured as follows.

Figure 3:
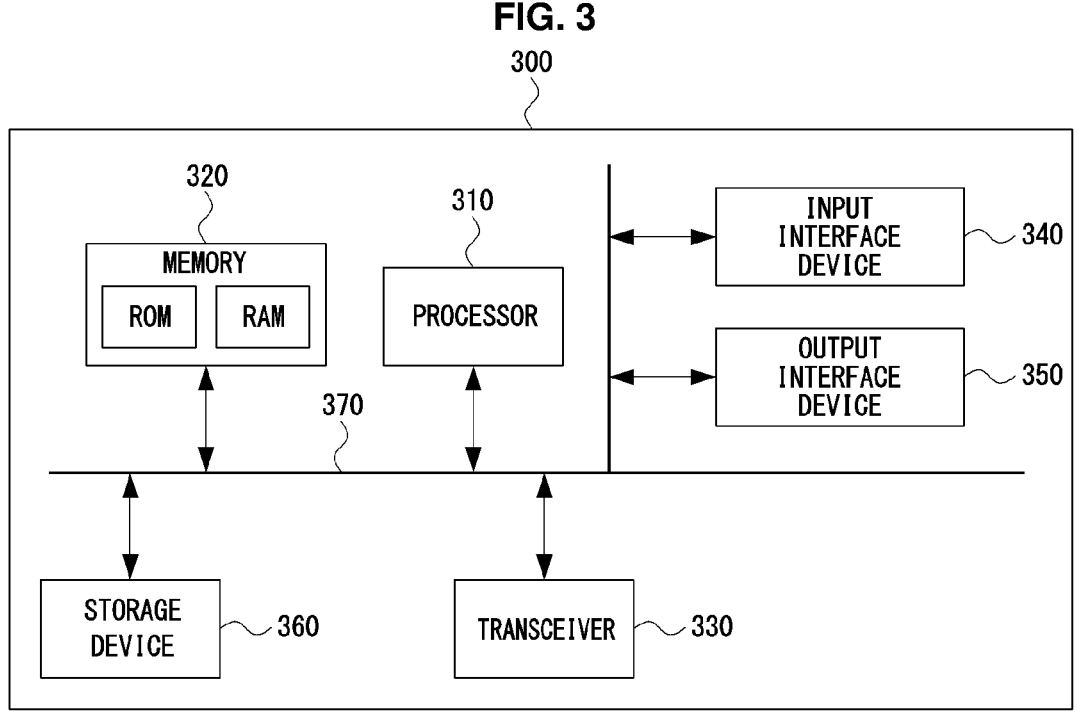
FIG. 3 is a conceptual diagram illustrating an exemplary embodiment of a communication node constituting a cellular communication system.

FIG. 3 is a conceptual diagram illustrating an exemplary embodiment of a communication node constituting a cellular communication system.

As shown in FIG. 3, a communication node 300 may comprise at least one processor 310, a memory 320, and a transceiver 330 connected to a network for performing communications. Also, the communication node 300 may further comprise an input interface device 340, an output interface device 350, a storage device 360, and the like. Each component included in the communication node 300 may communicate with each other as connected through a bus 370.

However, each of the components included in the communication node 300 may be connected to the processor 310 via a separate interface or a separate bus rather than the common bus 370. For example, the processor 310 may be connected to at least one of the memory 320, the transceiver 330, the input interface device 340, the output interface device 350, and the storage device 360 via a dedicated interface. The processor 310 may execute at least one instruction stored in at least one of the memory 320 and the storage device 360. The processor 310 may refer to a central processing unit (CPU), a graphics processing unit (GPU), or a dedicated processor on which methods in accordance with embodiments of the present disclosure are performed. Each of the memory 320 and the storage device 360 may include at least one of a volatile storage medium and a non-volatile storage medium. For example, the memory 320 may comprise at least one of read-only memory (ROM) and random access memory (RAM).

Referring again to FIG. 2, in the communication system, the base station 210 may form a macro cell or a small cell, and may be connected to the core network via an ideal backhaul or a non-ideal backhaul. The base station 210 may transmit signals received from the core network to the UEs 231 through 236 and the relay 220, and may transmit signals received from the UEs 231 through 236 and the relay 220 to the core network. The UEs 231, 232, 234, 235 and 236 may belong to cell coverage of the base station 210. The UEs 231, 232, 234, 235 and 236 may be connected to the base station 210 by performing a connection establishment procedure with the base station 210. The UEs 231, 232, 234, 235 and 236 may communicate with the base station 210 after being connected to the base station 210.

The relay 220 may be connected to the base station 210 and may relay communications between the base station 210 and the UEs 233 and 234. That is, the relay 220 may transmit signals received from the base station 210 to the UEs 233 and 234, and may transmit signals received from the UEs 233 and 234 to the base station 210. The UE 234 may belong to both of the cell coverage of the base station 210 and the cell coverage of the relay 220, and the UE 233 may belong to the cell coverage of the relay 220. That is, the UE 233 may be located outside the cell coverage of the base station 210. The UEs 233 and 234 may be connected to the relay 220 by performing a connection establishment procedure with the relay 220. The UEs 233 and 234 may communicate with the relay 220 after being connected to the relay 220.

The base station 210 and the relay 220 may support multiple-input, multiple-output (MIMO) technologies (e.g., single user (SU)-MIMO, multi-user (MU)-MIMO, massive MIMO, etc.), coordinated multipoint (CoMP) communication technologies, carrier aggregation (CA) communication technologies, unlicensed band communication technologies (e.g., Licensed Assisted Access (LAA), enhanced LAA (eLAA), etc.), sidelink communication technologies (e.g., ProSe communication technology, D2D communication technology), or the like. The UEs 231, 232, 235 and 236 may perform operations corresponding to the base station 210 and operations supported by the base station 210. The UEs 233 and 234 may perform operations corresponding to the relays 220 and operations supported by the relays 220.

Here, the base station 210 may be referred to as a Node B (NB), an evolved Node B (eNB), a base transceiver station (BTS), a radio remote head (RRH), a transmission reception point (TRP), a radio unit (RU), a roadside unit (RSU), a radio transceiver, an access point, an access node, or the like. The relay 220 may be referred to as a small base station, a relay node, or the like. Each of the UEs 231 through 236 may be referred to as a terminal, an access terminal, a mobile terminal, a station, a subscriber station, a mobile station, a portable subscriber station, a node, a device, an on-broad unit (OBU), or the like.

Meanwhile, the communications between the UEs 235 and 236 may be performed based on the sidelink communication technique. The sidelink communications may be performed based on a one-to-one scheme or a one-to-many scheme. When V2V communications are performed using the sidelink communication technique, the UE 235 may be the communication node located in the first vehicle 100 of FIG. 1 and the UE 236 may be the communication node located in the second vehicle 110 of FIG. 1. When V2I communications are performed using the sidelink communication technique, the UE 235 may be the communication node located in first vehicle 100 of FIG. 1 and the UE 236 may be the communication node located in the infrastructure 120 of FIG. 1. When V2P communications are performed using the sidelink communication technique, the UE 235 may be the communication node located in first vehicle 100 of FIG. 1 and the UE 236 may be the communication node carried by the person 130 of FIG. 1.

Meanwhile, the communications between the UEs 235 and 236 may be performed based on the sidelink communication technique. The sidelink communications may be performed based on a one-to-one scheme or a one-to-many scheme. When V2V communications are performed using the sidelink communication technique, the UE 235 may be the communication node located in the first vehicle 100 of FIG. 1 and the UE 236 may be the communication node located in the second vehicle 110 of FIG. 1. When V2I communications are performed using the sidelink communication technique, the UE 235 may be the communication node located in first vehicle 100 of FIG. 1 and the UE 236 may be the communication node located in the infrastructure 120 of FIG. 1. When V2P communications are performed using the sidelink communication technique, the UE 235 may be the communication node located in first vehicle 100 of FIG. 1 and the UE 236 may be the communication node carried by the person 130 of FIG. 1.

The scenarios to which the sidelink communications are applied may be classified as shown below in Table 1 according to the positions of the UEs (e.g., the UEs 235 and 236) participating in the sidelink communications. For example, the scenario for the sidelink communications between the UEs 235 and 236 shown in FIG. 2 may be a sidelink communication scenario C.

TABLE 1

| Sidelink Communication Scenario | Position of UE 235 | Position of UE 236 |
| --- | --- | --- |
| A | Out of coverage of base station 210 | Out of coverage of base station 210 |
| B | In coverage of base station 210 | Out of coverage of base station 210 |
| C | In coverage of base station 210 | In coverage of base station 210 |
| D | In coverage of base station 210 | In coverage of other base station |

Meanwhile, a user plane protocol stack of the UEs (e.g., the UEs 235 and 236) performing sidelink communications may be configured as follows.

Figure 4:
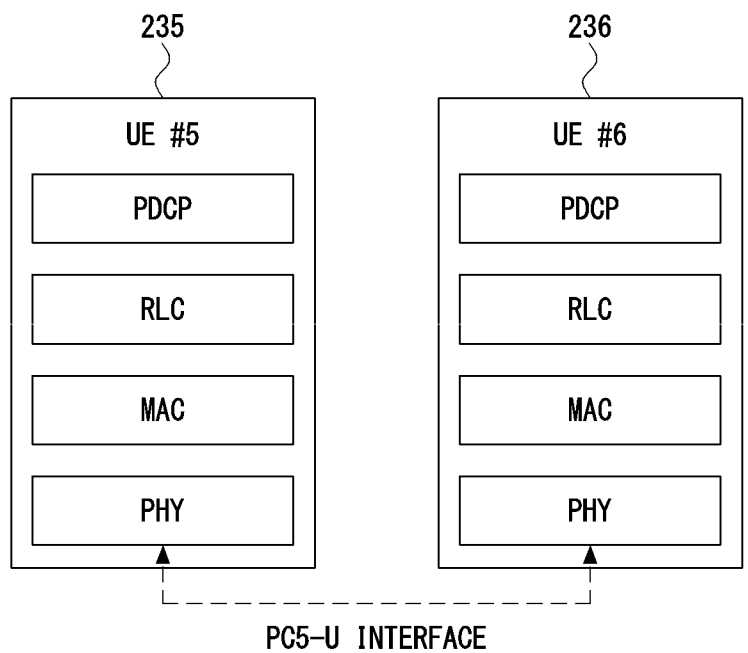
FIG. 4 is a block diagram illustrating an exemplary embodiment of a user plane protocol stack of a UE performing sidelink communication.

FIG. 4 is a block diagram illustrating an exemplary embodiment of a user plane protocol stack of a UE performing sidelink communication.

As shown in FIG. 4, a left UE may be the UE 235 shown in FIG. 2 and a right UE may be the UE 236 shown in FIG. 2. The scenario for the sidelink communications between the UEs 235 and 236 may be one of the sidelink communication scenarios A through D of Table 1. The user plane protocol stack of each of the UEs 235 and 236 may comprise a physical (PHY) layer, a medium access control (MAC) layer, a radio link control (RLC) layer, and a packet data convergence protocol (PDCP) layer.

The sidelink communications between the UEs 235 and 236 may be performed using a PC5 interface (e.g., PC5-U interface). A layer-2 identifier (ID) (e.g., a source layer-2 ID, a destination layer-2 ID) may be used for the sidelink communications, and the layer 2-ID may be an ID configured for the V2X communications (e.g., V2X service). Also, in the sidelink communications, a hybrid automatic repeat request (HARQ) feedback operation may be supported, and an RLC acknowledged mode (RLC AM) or an RLC unacknowledged mode (RLC UM) may be supported.

Meanwhile, a control plane protocol stack of the UEs (e.g., the UEs 235 and 236) performing sidelink communications may be configured as follows.

Figure 5:
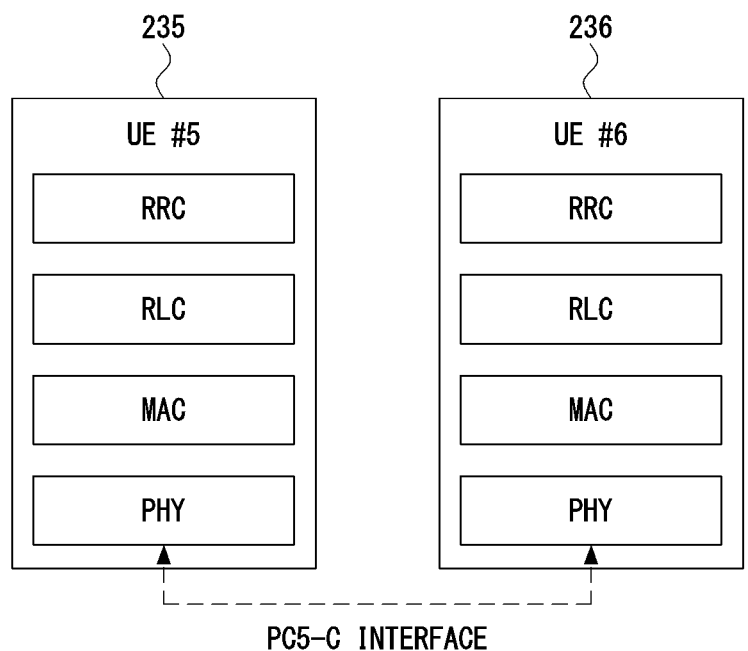
FIG. 5 is a block diagram illustrating a first exemplary embodiment of a control plane protocol stack of a UE performing sidelink communication.
Figure 6:
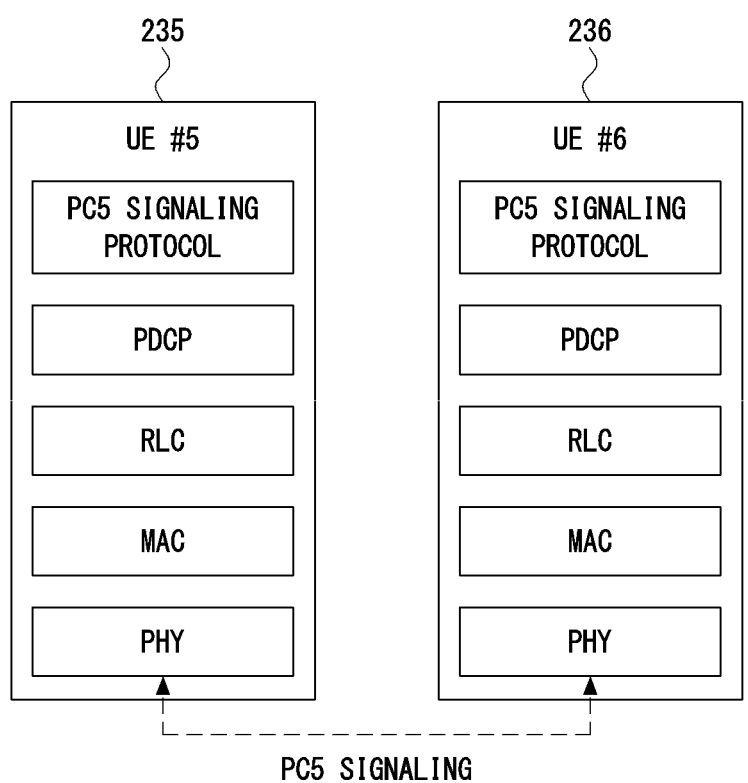
FIG. 6 is a block diagram illustrating a second exemplary embodiment of a control plane protocol stack of a UE performing sidelink communication.

FIG. 5 is a block diagram illustrating a first exemplary embodiment of a control plane protocol stack of a UE performing sidelink communication, and FIG. 6 is a block diagram illustrating a second exemplary embodiment of a control plane protocol stack of a UE performing sidelink communication.

As shown in FIGS. 5 and 6, a left UE may be the UE 235 shown in FIG. 2 and a right UE may be the UE 236 shown in FIG. 2. The scenario for the sidelink communications between the UEs 235 and 236 may be one of the sidelink communication scenarios A through D of Table 1. The control plane protocol stack illustrated in FIG. 5 may be a control plane protocol stack for transmission and reception of broadcast information (e.g., Physical Sidelink Broadcast Channel (PSBCH)).

The control plane protocol stack shown in FIG. 5 may include a PHY layer, a MAC layer, an RLC layer, and a radio resource control (RRC) layer. The sidelink communications between the UEs 235 and 236 may be performed using a PC5 interface (e.g., PC5-C interface). The control plane protocol stack shown in FIG. 6 may be a control plane protocol stack for one-to-one sidelink communication. The control plane protocol stack shown in FIG. 6 may include a PHY layer, a MAC layer, an RLC layer, a PDCP layer, and a PC5 signaling protocol layer.

Meanwhile, channels used in the sidelink communications between the UEs 235 and 236 may include a Physical Sidelink Shared Channel (PSSCH), a Physical Sidelink Control Channel (PSCCH), a Physical Sidelink Discovery Channel (PSDCH), and a Physical Sidelink Broadcast Channel (PSBCH). The PSSCH may be used for transmitting and receiving sidelink data and may be configured in the UE (e.g., UE 235 or 236) by a higher layer signaling. The PSCCH may be used for transmitting and receiving sidelink control information (SCI) and may also be configured in the UE (e.g., UE 235 or 236) by a higher layer signaling.

The PSDCH may be used for a discovery procedure. For example, a discovery signal may be transmitted over the PSDCH. The PSBCH may be used for transmitting and receiving broadcast information (e.g., system information). Also, a demodulation reference signal (DM-RS), a synchronization signal, or the like may be used in the sidelink communications between the UEs 235 and 236. The synchronization signal may include a primary sidelink synchronization signal (PSSS) and a secondary sidelink synchronization signal (SSSS).

Meanwhile, a sidelink transmission mode (TM) may be classified into sidelink TMs 1 to 4 as shown below in Table 2.

TABLE 2

| Sidelink TM | Description |
| --- | --- |
| 1 | Transmission using resources scheduled by base station |
| 2 | UE autonomous transmission without scheduling of base station |
| 3 | Transmission using resources scheduled by base station in V2X communications |
| 4 | UE autonomous transmission without scheduling of base station in V2X communications |

When the sidelink TM 3 or 4 is supported, each of the UEs 235 and 236 may perform sidelink communications using a resource pool configured by the base station 210. The resource pool may be configured for each of the sidelink control information and the sidelink data.

The resource pool for the sidelink control information may be configured based on an RRC signaling procedure (e.g., a dedicated RRC signaling procedure, a broadcast RRC signaling procedure). The resource pool used for reception of the sidelink control information may be configured by a broadcast RRC signaling procedure. When the sidelink TM 3 is supported, the resource pool used for transmission of the sidelink control information may be configured by a dedicated RRC signaling procedure. In this case, the sidelink control information may be transmitted through resources scheduled by the base station 210 within the resource pool configured by the dedicated RRC signaling procedure. When the sidelink TM 4 is supported, the resource pool used for transmission of the sidelink control information may be configured by a dedicated RRC signaling procedure or a broadcast RRC signaling procedure. In this case, the sidelink control information may be transmitted through resources selected autonomously by the UE (e.g., UE 235 or 236) within the resource pool configured by the dedicated RRC signaling procedure or the broadcast RRC signaling procedure.

When the sidelink TM 3 is supported, the resource pool for transmitting and receiving sidelink data may not be configured. In this case, the sidelink data may be transmitted and received through resources scheduled by the base station 210. When the sidelink TM 4 is supported, the resource pool for transmitting and receiving sidelink data may be configured by a dedicated RRC signaling procedure or a broadcast RRC signaling procedure. In this case, the sidelink data may be transmitted and received through resources selected autonomously by the UE (e.g., UE 235 or 236) within the resource pool configured by the dedicated RRC signaling procedure or the broadcast RRC signaling procedure.

Hereinafter, sidelink groupcast communication methods will be described. Even when a method (e.g., transmission or reception of a signal) to be performed at a first communication node among communication nodes is described, a corresponding second communication node may perform a method (e.g., reception or transmission of the signal) corresponding to the method performed at the first communication node. That is, when an operation of a UE #1 (e.g., vehicle #1) is described, a UE #2 (e.g., vehicle #2) corresponding thereto may perform an operation corresponding to the operation of the UE #1. Conversely, when an operation of the UE #2 is described, the corresponding UE #1 may perform an operation corresponding to the operation of the UE #2. In exemplary embodiments described below, an operation of a vehicle may be an operation of a communication node located in the vehicle.

The sidelink signal may be a synchronization signal and a reference signal used for sidelink communication. For example, the synchronization signal may be a synchronization signal/physical broadcast channel (SS/PBCH) block, sidelink synchronization signal (SLSS), primary sidelink synchronization signal (PSSS), secondary sidelink synchronization signal (SSSS), or the like. The reference signal may be a channel state information-reference signal (CSI-RS), DM-RS, phase tracking-reference signal (PT-RS), cell specific reference signal (CRS), sounding reference signal (SRS), discovery reference signal (DRS), or the like.

A sidelink channel may be a PSSCH, PSCCH, PSDCH, PSBCH, physical sidelink feedback channel (PSFCH), or the like. In addition, a sidelink channel may refer to a sidelink channel including a sidelink signal mapped to specific resources in the corresponding sidelink channel. The sidelink communication may support a broadcast service, a multicast service, a groupcast service, and a unicast service.

Figure 7:
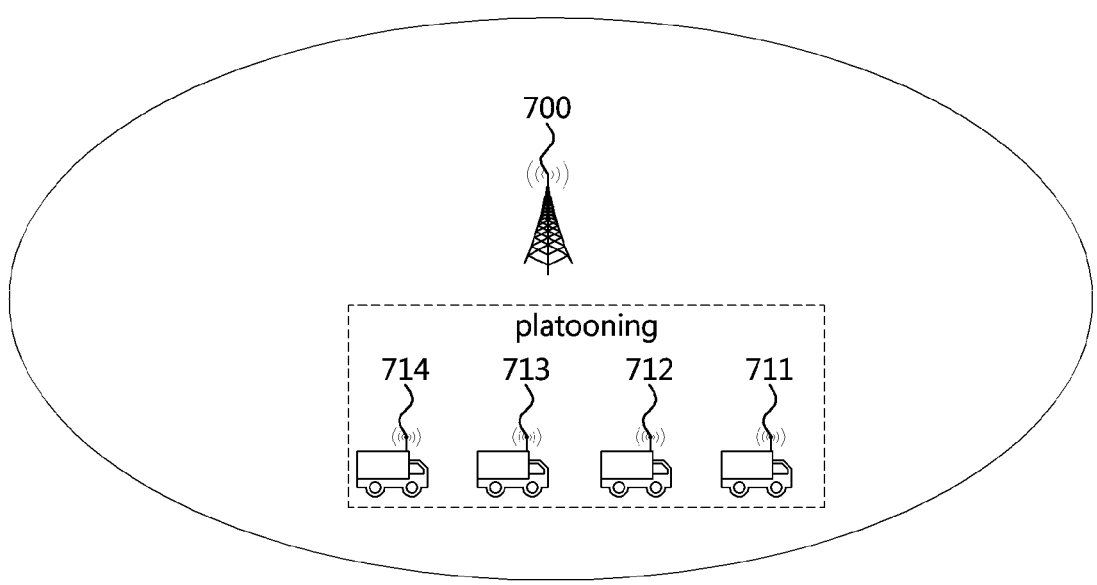
FIG. 7 is a conceptual diagram illustrating a platooning scenario in a communication system.

FIG. 7 is a conceptual diagram illustrating a platooning scenario in a communication system.

As shown in FIG. 7, a plurality of vehicles 711 to 714 may participate in a platooning. One vehicle (e.g., terminal located in the vehicle) among the plurality of vehicles 711 to 714 participating in the platooning may be referred to as a platoon leader (PL). For example, the vehicle #1 711 (e.g., UE #1 located in the vehicle #1 711) located at the head among the plurality of vehicles 711 to 714 participating in the platooning may be referred to as the PL. The PL 711 may lead the platooning and may control other vehicles 712 to 714.

Other vehicles 712 to 714 (e.g., terminals belonging to the vehicles) among the plurality of vehicles 711 to 714 participating in the platooning may be referred to as platoon members (PMs). Alternatively, the last vehicle #4 714 among the plurality of vehicles 711 to 714 participating in the platooning may be referred to as a platoon tail (PT). The PMs #1 to #3 (e.g., vehicles 712 to 714) may operate under controls of the PL 711.

The plurality of vehicles 711 to 714 participating in the platooning may perform sidelink groupcast communication. In this case, the PL 711 may be referred to as a sidelink groupcast header (SGH), and the PMs 712 to 714 may be referred to as sidelink groupcast members (SGMs). That is, in exemplary embodiments below, the PL may mean the SGH, and the SGH may mean the PL. Also, the PM may mean the SGM, and the SGM may mean the PM.

When the PL 711 is the UE #5 235 shown in FIG. 2, each of the PMs #1 to #3 712 to 714 may be the UE #6 236 shown in FIG. 2. Each of the PL 711, PM #1 712, PM #2 713, and PM #3 714 may be configured identically or similarly to the communication node 300 shown in FIG. 3. For example, each of the PL 711, PM #1 712, PM #2 713, and PM #3 714 may include an antenna array comprising a plurality of antenna elements. Each of the PL 711, PM #1 712, PM #2 713, and PM #3 714 may support the protocol stacks shown in FIGS. 4 to 6.

Each of the PL 711, PM #1 712, PM #2 713, and PM #3 714 participating in the platooning may be connected to a base station 700 (e.g., RSU), and may perform communications with the base station 700 in a beamforming scheme. In this case, a pair of 'transmission beam and reception beam' may be configured between the base station and each of the PL 711, PM #1 712, PM #2 713, and PM #3 714, and beamforming-based communication may be performed using the pair of 'transmission beam and reception beam'. Here, the reception beam may refer to a receiving direction.

In addition, sidelink communications may be performed among the PL 711, PM #1 712, PM #2 713, and PM #3 714 participating in the platooning, and the sidelink communications may be performed in a beamforming scheme. In this case, a pair of 'transmission beam and reception beam' may be configured between the PL 711 and each of the PM #1 712, PM #2 713, and PM #3 714, and beamforming-based communication may be performed using the pair of 'transmission beam and reception beam'. The 'transmission beam and reception beam' may be configured through a beam management procedure (e.g., beam configuration procedure).

Meanwhile, transmission modes (TMs) for V2X communication may be defined as shown in Table 3 below.

TABLE 3

| V2X TM | Description |
| --- | --- |
| #1 | Terminal (i.e., UE) autonomously selects sidelink resources for transmission. |
| #2 | Terminal supports selection of sidelink resources for other terminal(s). |
| #3 | NR configured giant (CG) (e.g., type 1) for sidelink transmission is configured to a terminal. That is, the terminal performs sidelink communication based on the NR CG. |
| #4 | Terminal schedules sidelink transmission of other terminal(s). |

The V2X TMs defined in Table 3 may be used for sidelink communication between vehicles participating in a platooning. Sidelink resources required according to the V2X mode may be different. Therefore, the base station may allocate sidelink resources required according to the V2X TM to the PL (e.g., SGH), and the PL may perform sidelink communication according to the V2X TM using the sidelink resources allocated by the base station. In exemplary embodiments below, sidelink communication methods according to the V2X TM will be described.

Figure 8:
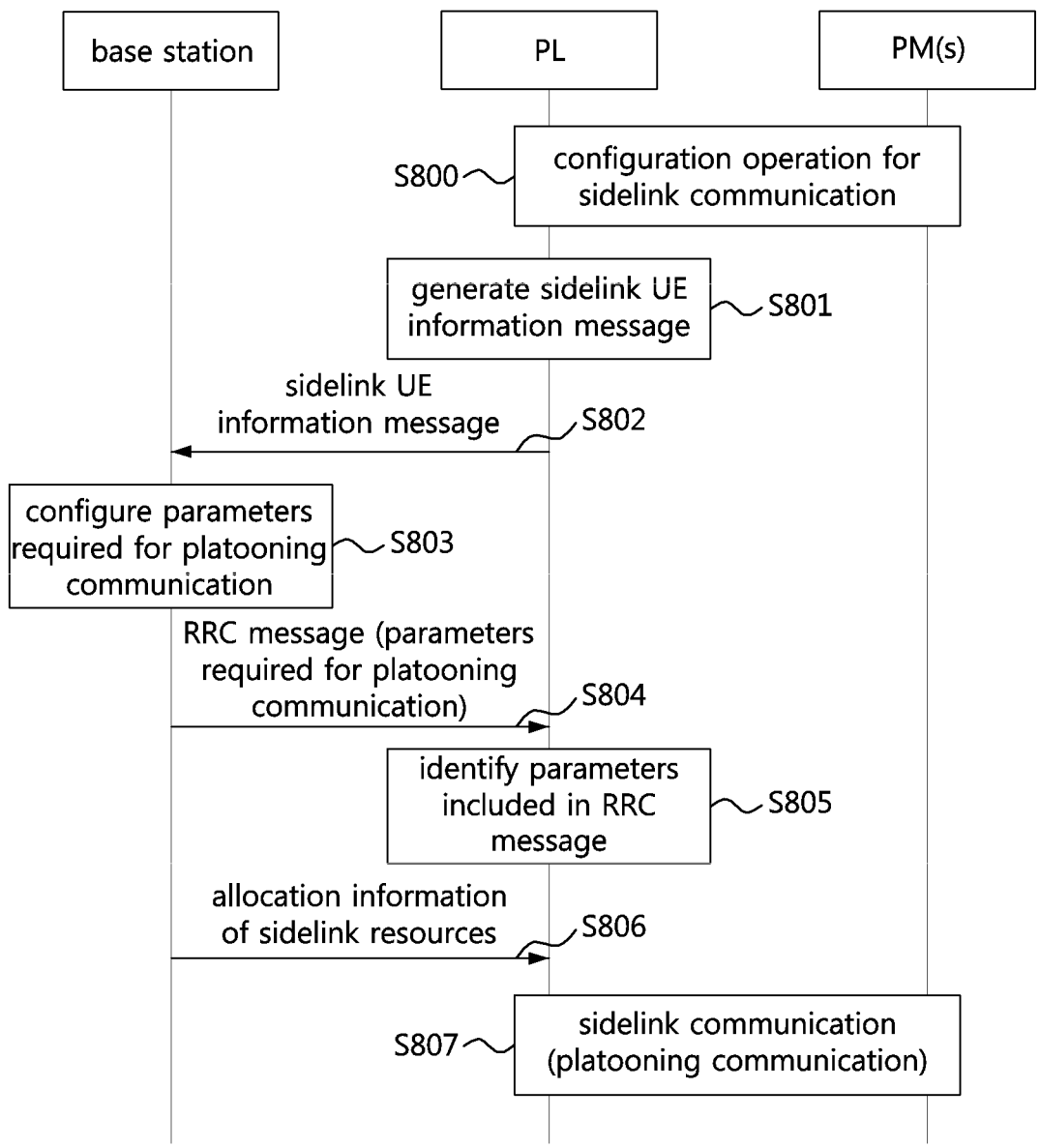
FIG. 8 is a sequence chart illustrating a first exemplary embodiment of a sidelink communication method in a communication system.

FIG. 8 is a sequence chart illustrating a first exemplary embodiment of a sidelink communication method in a communication system.

As shown in FIG. 8, the communication system may include a base station, a PL, and PM(s). The PL may be a SGH and the PM may be a SGM. Each of the PL and PM(s) may be connected with the base station. For example, each of the PL and PM(s) may operate in an RRC connected state, RRC inactive state, or RRC idle state. Each of the PL and PM(s) may include an entity performing functions of an higher layer (e.g., V2X layer) and an entity performing functions of an access stratum (AS) layer (e.g., RRC layer). The entity performing functions of the higher layer may be referred to as a 'higher layer entity', and the entity performing functions of the AS layer may be referred to as an 'AS layer entity'.

The PL and PM(s) may be located in vehicles participating in the platooning. The PL may be the PL 711 shown in FIG. 7, and the PM(s) may be the PMs 712 to 714 shown in FIG. 7. An operation for configuring sidelink communication between the PL and PM(s) may be performed (S800). In the step S800, PMs participating in sidelink communication may be determined, and one PM among the PMs may be determined as the PL. For example, a platooning group (e.g., sidelink groupcast group) including the PL and the PM(s) may be configured.

The PL may determine a V2X TM used for sidelink communication between the PL and PM(s) (e.g., one V2X TM among the V2X TMs #1 to #4 defined in Table 3). In addition, the PL may determine a sidelink service type. The sidelink service type may indicate a sidelink service supported by the PL and PM(s). The sidelink service may include a sidelink (SL) broadcast service, SL multicast service, SL groupcast service, and SL unicast service.

The SL groupcast service for the platooning scenario may be distinguished from a SL groupcast service for scenarios other than the platooning scenario. In order to distinguish the SL groupcast services for the respective scenarios, a provider service identifier (PSID) and/or an intelligent transport system-application identifier (ITS-AID) may be used. An identifier indicating a SL groupcast service for the platooning scenario and an identifier indicating a SL groupcast service for a scenario other than the platooning scenario may be defined. The identifier indicating the SL groupcast service for each scenario may be associated with a destination layer 2 identifier.

The V2X TM and sidelink service type may be determined by the higher layer entity included in the PL. The V2X TM determined by the higher layer entity may be one of the V2X TMs #1 to #4 defined in Table 3. The sidelink service type determined by the higher layer entity may indicate the SL broadcast service, SL multicast service, SL groupcast service (e.g., SL groupcast service for the platooning scenario or SL groupcast service for a scenario other than the platooning scenario), or SL unicast service.

The higher layer entity of the PL may deliver one or more of the V2X TM, the sidelink service type, and a PL operation indicator to the AS layer entity of the PL. The PL operation indicator may indicate that the corresponding vehicle (e.g., terminal located in the vehicle) operates as the PL. The AS layer entity of the PL may obtain the one or more of the V2X TM, the sidelink service type, and the PL operation indicator from the higher layer entity of the PL. In addition, the information delivered from the higher layer entity of the PL to the AS layer entity of the PL may further include an indicator indicating whether the SL groupcast service indicated by the sidelink service type is a SL groupcast service for the platooning scenario or a SL groupcast service for a scenario other than the platooning scenario.

The PL may generate a sidelink UE information message including configuration information for sidelink communication (S801). For example, the AS layer entity of the PL may generate sidelink UE information message including one or more of the V2X TM, the sidelink service type, and the PL operation indicator. In addition, the sidelink UE information message may further include a terminal identifier. For example, the terminal identifier may be a ProSe UE identifier (ID). The terminal identifier may be associated with the PL operation indicator. In this case, the base station may identify a terminal operating as the PL using the terminal identifier and the PL operation indicator. That is, the base station may use the terminal identifier and the PL operation indicator to identify a terminal (i.e., PL) supporting selection of sidelink resources for other terminal(s) or a terminal (i.e., PL) scheduling sidelink transmission of other terminal(s).

In addition, the V2X TM may be associated with the terminal identifier (e.g., ProSe UE ID). When the PL (e.g., SGH) is changed in the platooning scenario supporting sidelink groupcast communication, the base station may inform the PMs (e.g., SGMs) of information on the changed PL by using the terminal identifier.

A sidelink resource allocation scheme may vary according to the V2X TM. That is, sidelink resources allocated to the PL by the base station may vary according to the V2X TM. Therefore, when the base station knows the V2X TM supported by the PL, the base station can allocate sidelink resources required according to the V2X TM to the PL, and thus the sidelink resources can be efficiently scheduled. For example, the base station identifying the V2X TM supported by the PL may allocate sidelink resources for each PM(s) to the PL. In this case, the PL may allocate the sidelink resources configured by the base station to each of the PM(s). Alternatively, the base station identifying the V2X TM supported by the PL may allocate all sidelink resources to the PL without individual allocations for the PM(s). In this case, the PL may autonomously allocate sidelink resources to the PM(s).

The PL may transmit the sidelink UE information message including the one or more of the V2X TM, sidelink service type, PL operation indicator, and terminal identifier to the base station (S802). The sidelink UE information message may include other information element(s) in addition to the V2X TM, sidelink service type, PL operation indicator, and terminal identifier. For example, the sidelink UE information message may include information indicating the number of the PM(s) participating in platooning communication and identifier(s) of the PM(s) (e.g., identifier(s) of the terminal(s) operating as the PM(s)). The sidelink UE information message may include one or more information elements defined in Tables 4 to 7 below.

TABLE 4

```
-- ASN1START
SidelinkUEInformation-r12 ::=       SEQUENCE {
    criticalExtensions              CHOICE {
        c1                              CHOICE {
            sidelinkUEInformation-r12       SidelinkUEInformation-r12-IEs,
            spare3 NULL, spare2 NULL, spare1 NULL
        },
        criticalExtensionsFuture        SEQUENCE { }
    }
}
SidelinkUEInformation-r12-IEs ::=  SEQUENCE {
    commRxInterestedFreq-r12           ARFCN-ValueEUTRA-r9             OPTIONAL,
    commTxResourceReq-r12              SL-CommTxResourceReq-r12        OPTIONAL,
    discRxInterest-r12                 ENUMERATED {true}               OPTIONAL,
    discTxResourceReq-r12              INTEGER (1..63)                 OPTIONAL,
    lateNonCriticalExtension           OCTET STRING                    OPTIONAL,
    nonCriticalExtension               SidelinkUEInformation-v1310-IEs OPTIONAL
}
```

TABLE 5

```
SidelinkUEInformation-v1310-IEs ::=  SEQUENCE {
    commTxResourceReqUC-r13              SL-CommTxResourceReq-r12 OPTIONAL,
    commTxResourceInfoReqRelay-r13       SEQUENCE {
        commTxResourceReqRelay-r13           SL-CommTxResourceReq-r12          OPTIONAL,
        commTxResourceReqRelayUC-r13         SL-CommTxResourceReq-r12          OPTIONAL,
        ue-Type-r13                          ENUMERATED {relayUE, remoteUE}
    }                                                                          OPTIONAL,
    discTxResourceReq-v1310              SEQUENCE {
        carrierFreqDiscTx-r13                INTEGER (1..maxFreq)              OPTIONAL,
        discTxResourceReqAddFreq-r13         SL-DiscTxResourceReqPerFreqList-r13  OPTIONAL
    }                                                                          OPTIONAL,
    discTxResourceReqPS-r13              SL-DiscTxResourceReq-r13          OPTIONAL,
    discRxGapReq-r13                     SL-GapRequest-r13                 OPTIONAL,
    discTxGapReq-r13                     SL-GapRequest-r13                 OPTIONAL,
    discSysInfoReportFreqList-r13        SL-DiscSysInfoReportFreqList-r13  OPTIONAL,
    nonCriticalExtension                 SidelinkUEInformation-v1430-IEs   OPTIONAL
}
SidelinkUEInformation-v1430-IEs ::=  SEQUENCE {
    v2x-CommRxInterestedFreqList-r14  SL-V2X-CommFreqList-r14           OPTIONAL,
    p2x-CommTxType-r14                ENUMERATED {true}                 OPTIONAL,
    v2x-CommTxResourceReq-r14         SL-V2X-CommTxFreqList-r14         OPTIONAL,
    nonCriticalExtension              SidelinkUEInformation-v16-IEs     OPTIONAL
}
```

TABLE 6

```
SidelinkUEInfonnation-v16-IEs ::= SEQUENCE {
    GroupcastHeader-ResourceAllocation-Type-r16      ENUMERATED {eNB Controlled, Resource
Allocation Assist,
        Resource Schedule, Preconfigured}           OPTIONAL,
    GroupcastHeader-Identity-r16                    ProSe UE ID              OPTIONAL,
    nonCriticalExtension                            SEQUENCE { }                    OPTIONAL
|
SL-CommTxResourceReq-r12 ::=                        SEQUENCE {
    carrierFreq-r12                                 ARFCN-ValueEUTRA-r9      OPTIONAL,
    destinationInfoList-r12                         SL-DestinationInfoList-r12
}
SL-DiscTxResourceReqPerFreqList-r13 ::= SEQUENCE (SIZE (1..maxFreq)) OF SL-
DiscTxResourceReq-r13
SL-DiscTxResourceReq-r13 ::=                        SEQUENCE {
    carrierFreqDiscTx-r13                           INTEGER (1..maxFreq)     OPTIONAL,
    discTxResourceReq-r13                           INTEGER (1..63)
}
SL-DestinationInfoList-r12 ::= SEQUENCE (SIZE (1..maxSL-Dest-r12)) OF SL-DestinationIdentity-r12
SL-DestinationIdentity-r12 ::= BIT STRING (SIZE (24))
```

TABLE 7

```
SL-DiscSysInfoReportFreqList-r13 ::= SEQUENCE (SIZE (1.. maxSL-DiscSysInfoReportFreq-r13)) OF
SL-DiscSysInfoReport-r13
SL-V2X-CommFreqList-r14 ::= SEQUENCE (SIZE (1..maxFreqV2X-r14)) OF INTEGER
(0..maxFreqV2X-1-r14)
SL-V2X-CommTxFreqList-r14 ::= SEQUENCE (SIZE (1..maxFreqV2X-r14)) OF SL-V2X-
CommTxResourceReq-r14
SL-V2X-CommTxResourceReq-r14 ::=        SEQUENCE {
    carrierFreqCommTx-r14               INTEGER (0.. maxFreqV2X-1-r14)      OPTIONAL,
    v2x-TypeTxSync-r14                  SL-TypeTxSync-r14                   OPTIONAL,
    v2x-DestinationInfoList-r14         SL-DestinationInfoList-r12          OPTIONAL
}
SL-DestinationIdentity-r12 ::= BIT STRING (SIZE (24))
-- ASN1STOP
```

In Table 6, 'GroupcastHeader-ResourceAllocation-Type' may indicate the V2X TM. 'eNB controlled' may refer to the V2X TM #1. 'Resource Allocation Assist' may refer to the V2X TM #2, 'Preconfigured' may refer to the V2X TM #3, and 'Resource Schedule' may refer to the V2X TM #4. In Table 6, 'GroupcastHeader-Identity' refer to the terminal identifier, 'GroupcastHeader-operation' may refer to the PL operation indicator, and 'SidelinkSerivceType' may refer to the sidelink service type. 'groupcast-type 1' may indicate SL groupcast communication in the platooning scenario, and 'groupcast-type 2' may indicate SL groupcast communication in a scenario other than the platooning scenario.

'ProSe UE ID' of Table 6 may be defined as shown in Table 8 below. A first element of the 'ProSe UE ID' field may include a first digit of a ProSe UE ID, and a second element of the ProSe UE ID field may include a second digit of the ProSe UE ID.

TABLE 8

```
-- ASN1START
ProSe UE ID ::=    SEQUENCE {SEE (24)} OF ProSe UE ID
-- ASN1STOP
```

Meanwhile, the base station may receive the sidelink UE information message from the PL, and may identify the information elements included in the sidelink UE information message. For example, the base station may identify one or more of the V2X TM, sidelink service type, PL operation indicator, and terminal identifier, which are included in the sidelink UE information message.

The base station may determine whether a terminal indicated by the terminal identifier included in the sidelink UE information message can operate as a PL (e.g., SGH). For example, the base station may determine whether the corresponding terminal can operate as a PL by using capability information received from the terminal. When it is determined that the terminal indicated by the sidelink UE information message is capable of operating as a PL, the base station may configure parameters (e.g., information elements) required for platooning communication (S803). For example, the base station may configure a group radio network temporary identifier (RNTI) to be used in the platooning communication.

The group RNTI may be used in the platooning scenario that supports sidelink groupcast communication. For example, when the sidelink service type included in the sidelink UE information message indicates SL groupcast communication, the base station may configure the group RNTI. The group RNTI may be associated with the identifier of the PL (e.g., ProSe UE ID).

Meanwhile, since the size of the sidelink resources allocated by the base station varies according to the number of PMs included in the platooning group (e.g., SL groupcast group), the base station needs to know information on the PMs belonging to the platooning group in order to efficiently schedule sidelink resources. Accordingly, the base station may generate the identifier of the platooning group to be formed by the PL, and may configure a reporting periodicity of the information on the PM(s) belonging to the platooning group.

The identifier of the platooning group may be mapped to the group RNTI. The information on the PM(s) may include information indicating the number of the PM(s), an identifier of each of the PM(s) (e.g., identifier of a terminal operating as the PM), and the like. For example, the reporting periodicity may be set to 10 ms (millisecond), 20 ms, 40 ms, 80 ms, 160 ms, or the like. Alternatively, the base station may configure an event triggering reporting of the information on the PM(s) belonging to the platooning group. For example, the event may be 'when a new PM joins the platooning group' or 'when an existing PM included in the platooning group leaves'.

The base station may generate a message including the group RNTI, the identifier of the platooning group, and the reporting periodicity of the information on the PM(s), and may transmit the message to the PL (S804). For example, the message including the group RNTI may be an RRC connection reconfiguration message. The RRC connection reconfiguration message may include one or more information elements defined in Tables 9 to 17 below. In Table 13 below, 'newUE-Idenity' may indicate the group RNTI, 'groupcastIdentity' may indicate the identifier of the platooning group, and 'periodic-GroupcstGroupReport' may indicate the reporting periodicity of the information on the PM(s).

TABLE 9

```
-- ASN1START
RRCConnectionReconfiguration ::= SEQUENCE {
    rrc-TransactionIdentifier          RRC-TransactionIdentifier,
    criticalExtensions                 CHOICE {
        c1                                 CHOICE{
            rrcConnectionReconfiguration-r8    RRCConnectionReconfiguration-r8-IEs,
            spare7 NULL,
            spare6 NULL, spare5 NULL, spare4 NULL,
            spare3 NULL, spare2 NULL, spare1 NULL
        },
        criticalExtensionsFuture           SEQUENCE { }
    }
}
RRCConnectionReconfiguration-r8-IEs ::= SEQUENCE {
    measConfig                         MeasConfig                          OPTIONAL,
    -- Need ON
    mobilityControlInfo                MobilityControlInfo                 OPTIONAL,  -- Cond HO
    dedicatedInfoNASList               SEQUENCE (SIZE(1..maxDRB)) OF
                                           DedicatedInfoNAS                OPTIONAL,  -- Cond nonHO
    radioResourceConfigDedicated       RadioResourceConfigDedicated        OPTIONAL,  -- Cond HO-toEUTRA
    securityConfigHO                   SecurityConfigHO                    OPTIONAL,  -- Cond HO
    nonCriticalExtension               RRCConnectionReconfiguration-v890-IEs  OPTIONAL
}
RRCConnectionReconfiguration-v890-IEs ::= SEQUENCE {
    lateNonCriticalExtension OCTET STRING (CONTAINING
RRCConnectionReconfiguration-v8m0-IEs)     OPTIONAL,
    nonCriticalExtension               RRCConnectionReconfiguration-v920-IEs  OPTIONAL
}
```

TABLE 10

```
-- Late non-critical extensions:
RRCConnectionReconfiguration-v8m0-IEs ::= SEQUENCE {
    -- Following field is only for pre REL-10 late non-critical extensions
    lateNonCriticalExtension           OCTET STRING                        OPTIONAL,
    nonCriticalExtension               RRCConnectionReconfiguration-v10i0-IEs  OPTIONAL
}
RRCConnectionReconfiguration-v10i0-IEs ::= SEQUENCE {
    antennaInfoDedicatedPCell-v10i0    AntennaInfoDedicated-v10i0          OPTIONAL,  -- Need ON
    nonCriticalExtension               RRCConnectionReconfiguration-v10l0-IEs  OPTIONAL
}
RRCConnectionReconfiguration-v10l0-IEs ::= SEQUENCE {
    mobilityControlInfo-v10l0          MobilityControlInfo-v10l0           OPTIONAL,
    sCellToAddModList-v10l0            SCellToAddModList-v10l0             OPTIONAL,  -- Need ON
    -- Following field is only for late non-critical extensions from REL-10 to REL-11
    lateNonCriticalExtension           OCTET STRING                        OPTIONAL,
    nonCriticalExtension               RRCConnectionReconfiguration-v12f0-IEs  OPTIONAL
}
RRCConnectionReconfiguration-v12f0-IEs ::= SEQUENCE {
    scg-Configuration-v12f0            SCG-Configuration-v12f0             OPTIONAL,  -- Cond nonFullConfig
    -- Following field is only for late non-critical extensions from REL-12
    lateNonCriticalExtension           OCTET STRING                        OPTIONAL,
    nonCriticalExtension               RRCConnectionReconfiguration-v1370-IEs  OPTIONAL
}
```

TABLE 11

```
RRCConnectionReconfiguration-v1370-IEs ::= SEQUENCE {
    radioResourceConfigDedicated-v1370    RadioResourceConfigDedicated-v1370    OPTIONAL,    --
Need ON
    sCellToAddModListExt-v1370    SCellToAddModListExt-v1370OPTIONAL,    -- Need ON
    -- Following field is only for late non-critical extensions from REL-13 onwards
    nonCriticalExtension    SEQUENCE { }    OPTIONAL
}
-- Regular non-critical extensions:
RRCConnectionReconfiguration-v920-IEs ::= SEQUENCE {
    otherConfig-r9    OtherConfig-r9    OPTIONAL,    -- Need ON
    fullConfig-r9    ENUMERATED {true}    OPTIONAL,    -- Cond
HO-Reestab
    nonCriticalExtension    RRCConnectionReconfiguration-v1020-IEs    OPTIONAL
}
RRCConnectionReconfiguration-v1020-IEs ::= SEQUENCE {
    sCellToReleaseList-r10    SCellToReleaseList-r10    OPTIONAL,    -- Need ON
    sCellToAddModList-r10    SCellToAddModList-r10    OPTIONAL,    --
Need ON
    nonCriticalExtension    RRCConnectionReconfiguration-v1130-IEs    OPTIONAL
}
RRCConnectionReconfiguration-v1130-IEs ::= SEQUENCE {
    systemInformationBlockType1Dedicated-r11 OCTET STRING (CONTAINING
SystemInformationBlockType1)
        OPTIONAL,    -- Need ON
    nonCriticalExtension    RRCConnectionReconfiguration-v1250-IEs    OPTIONAL
}
```

TABLE 12

```
RRCConnectionReconfiguration-v1250-IEs ::= SEQUENCE {
    wlan-OffloadInfo-r12    CHOICE {
        release    NULL,
        setup    SEQUENCE {
            wlan-OffloadConfigDedicated-r12    WLAN-OffloadConfis-r12,
            t350-r12    ENUMERATED {min5, min10, min20,
min30, min60,
                min120, min180, spare1}OPTIONAL    --
Need OR
        }
    }    OPTIONAL,
    -- Need ON
    scg-Configuration-r12    SCG-Configuration-r12    OPTIONAL,    -- Cond
nonFullConfig
    sl-SyncTxControl-r12    SL-SyncTxControl-r12    OPTIONAL,    -- Need
ON
    sl-DiscConfig-r12    SL-DiscConfig-r12    OPTIONAL,    -- Need
ON
    sl-CommConfig-r12    SL-CommConfig-r12    OPTIONAL,    --
Need ON
    nonCriticalExtension    RRCConnectionReconfieuration-v1310-IEs    OPTIONAL
}
RRCConnectionReconfiguration-v1310-IEs ::= SEQUENCE {
    sCellToReleaseListExt-r13    SCellToReleaseListExt-r13    OPTIONAL,    -- Need
ON
    sCellToAddModListExt-r13    SCellToAddModListExt-r13    OPTIONAL,    -- Need
ON
    lwa-Configuration-r13    LWA-Configuration-r13    OPTIONAL,    -- Need
ON
    lwip-Configuration-r13    LWIP-Configuration-r13    OPTIONAL,    -- Need
ON
    rclwi-Configuration-r13    RCLWI-Configuration-r13    OPTIONAL,    --
Need ON
    nonCriticalExtension    RRCConnectionReconfiguration-v1430-
IEs    OPTIONAL
}
RRCConnectionReconfiguration-v1430-IEs ::= SEQUENCE {
    sl-V2X-ConfigDedicated-r14    SL-V2X-ConfigDedicated-r14    OPTIONAL,    -- Need ON
    sCellToAddModListExt-v1430    SCellToAddModListExt-v1430    OPTIONAL,    -- Need ON
    perCC-GapIndicationRequest-r14    ENUMERATED{true}    OPTIONAL,    --
Need ON
    systemInformationBlockType2Dedicated-r14 OCTET STRING (CONTAINING
SystemInformationBlockType2)    OPTIONAL,    --
Cond nonHO
    nonCriticalExtension    RRCConnectionReconfiguration-v16-IEs OPTIONAL
}
```

TABLE 13

```
RRCConnectionReconfiguration-v16-IEs ::= SEQUENCE {
  newUE-Identity                         Group-RNTI
  nonCriticalExtension                   SEQUENCE { }              OPTIONAL
}
SL-SyncTxControl-r12 ::=                 SEQUENCE {
  networkControlledSyncTx-r12              ENUMERATED {on, off}    OPTIONAL  --
Need OP
}
PSCellToAddMod-r12 ::=                   SEQUENCE {
  sCellIndex-r12                           SCellIndex-r10,
  cellIdentification-r12                   SEQUENCE {
    physCellId-r12                           PhysCellId,
    dl-CarrierFreq-r12                       ARFCN-ValueEUTRA-r9
  }                                                                OPTIONAL,
  -- Cond SCellAdd
  radioResourceConfigCommonPSCell-r12      RadioResourceConfigCommonPSCell-
r12 OPTIONAL,   -- Cond SCellAdd
  radioResourceConfigDedicatedPSCell-r12RadioResourceConfigDedicatedPSCell-
r12 OPTIONAL,   -- Cond SCellAdd2
  ...,
  [[ antennaInfoDedicatedPSCell-v1280     AntennaInfoDedicated-v10i0  OPTIONAL  --  Need
ON
  ]],
  [[ sCellIndex-r13                       SCellIndex-r13 OPTIONAL    -- Need ON
  ]],
  [[ radioResourceConfigDedicatedPSCell-v1370   RadioResourceConfigDedicatedPSCell-v1370
     OPTIONAL   -- Need ON
  ]]
}
```

TABLE 14

```
PSCellToAddMod-v12f0 ::=                 SEQUENCE {
  radioResourceConfigCommonPSCell-r12      RadioResourceConfigCommonPSCell-v12f0
  OPTIONAL
}
PSCellToAddMod-v1440 ::=                 SEQUENCE {
  radioResourceConfigCommonPSCell-r14      RadioResourceConfigCommonPSCell-v1440
  OPTIONAL
}
PowerCoordinationInfo-r12 ::= SEQUENCE {
  p-MeNB-r12                               INTEGER (1..16),
  p-SeNB-r12                               INTEGER (1..16),
  powerControlMode-r12                     INTEGER (1..2)
}
SCellToAddModList-r10 ::=                SEQUENCE (SIZE (1..maxSCell-r10)) OF SCellToAddMod-r10
SCellToAddModList-v10l0 ::=              SEQUENCE (SIZE (1..maxSCell-r10)) OF SCellToAddMod-v10l0
SCellToAddModListExt-r13 ::=             SEQUENCE (SIZE (1..maxSCell-r13)) OF SCellToAddModExt-r13
SCellToAddModListExt-v1370 ::=           SEQUENCE (SIZE (1..maxSCell-r13)) OF SCellToAddModExt-v1370
SCellToAddModListExt-v1430 ::=           SEQUENCE (SIZE (1..maxSCell-r13)) OF SCellToAddModExt-v1430
SCellToAddMod-r10 ::=                    SEQUENCE {
  sCellIndex-r10                           SCellIndex-r10,
  cellIdentification-r10                   SEQUENCE {
    physCellId-r10                           PhysCellId,
    dl-CarrierFreq-r10                       ARFCN-ValueEUTRA
  }                                            OPTIONAL,  --
Cond SCellAdd
  radioResourceConfigCommonSCell-r10       RadioResourceConfigCommonSCell-
r10 OPTIONAL,   -- Cond SCellAdd
  radioResourceConfigDedicatedSCell-r10    RadioResourceConfigDedicatedSCell-r10 OPTIONAL,  --
Cond SCellAdd2
  ...,
  [[ dl-CarrierFreq-v1090                 ARFCN-ValueEUTRA-v9e0   OPTIONAL  --  Cond
EARFCN-max
  ]],
  [[ antennaInfoDedicatedSCell-v10i0      AntennaInfoDedicated-v10i0  OPTIONAL  --  Need
ON
  ]],
  [[ srs-SwitchFromServCellIndex-r14      INTEGER (0..31) OPTIONAL-- Need ON
  ]]
}
```

TABLE 15

```
SCellToAddMod-v10l0 ::=                SEQUENCE {
    radioResourceConfigCommonSCell-v10l0    RadioResourceConfigCommonSCell-v10l0
OPTIONAL
}
SCellToAddModExt-r13 ::=               SEQUENCE {
    sCellIndex-r13                         SCellIndex-r13,
    cellIdentification-r13                 SEQUENCE {
        physCellId-r13                         PhysCellId,
        dl-CarrierFreq-r13                     ARFCN-ValueEUTRA-r9
    }                                                                  OPTIONAL,  --
Cond SCellAdd
    radioResourceConfigCommonSCell-r13     RadioResourceConfigCommonSCell-
r10 OPTIONAL,  -- Cond SCellAdd
    radioResourceConfigDedicatedSCell-r13  RadioResourceConfigDedicatedSCell-r10 OPTIONAL,  --
Cond SCellAdd2
    antennaInfoDedicatedSCell-r13          AntennaInfoDedicated-v10i0     OPTIONAL  -- Need
ON
}
SCellToAddModExt-v1370 ::=             SEQUENCE {
    radioResourceConfigCommonSCell-v1370   RadioResourceConfigCommonSCell-v10l0
OPTIONAL
}
SCellToAddModExt-v1430 ::=             SEQUENCE {
    srs-SwitchFromServCellIndex-r14        INTEGER (0..31)                OPTIONAL,  -- Need
ON
    ...
}
SCellToReleaseList-r10 ::=              SEQUENCE (SIZE (1..maxSCell-r10)) OF SCellIndex-r10
SCellToReleaseListExt-r13 ::=           SEQUENCE (SIZE (1..maxSCell-r13)) OF SCellIndex-r13
SCG-Configuration-r12 ::=               CHOICE {
    release                                 NULL,
    setup                                   SEQUENCE {
        scg-ConfigPartMCG-r12                   SEQUENCE {
            scg-Counter-r12                         INTEGER (0..65535)
OPTIONAL,  -- Need ON
            powerCoordinationInfo-r12               PowerCoordinationInfo-r12     OPTIONAL,  --
Need ON
            ...
        }                                                                  OPTIONAL,
-- Need ON
        scg-ConfigPartSCG-r12                   SCG-ConfigPartSCG-r12         OPTIONAL  --
Need ON
    }
}
```

TABLE 16

```
SCG-Configuration-v12f0 ::=            CHOICE {
    release                                NULL,
    setup                                  SEQUENCE {
        scg-ConfigPartSCG-v12f0                SCG-ConfigPartSCG-v12f0       OPTIONAL  --
Need ON
    }
}
SCG-ConfigPartSCG-r12 ::=              SEQUENCE {
    radioResourceConfigDedicatedSCG-r12    RadioResourceConfigDedicatedSCG-r12   OPTIONAL,  --
Need ON
    sCellToReleaseListSCG-r12              SCellToReleaseList-r10                OPTIONAL,  -- Need ON
    pSCellToAddMod-r12                     PSCellToAddMod-r12                    OPTIONAL,  --
Need ON
    sCellToAddModListSCG-r12               SCellToAddModList-r10                 OPTIONAL,  -- Need ON
    mobilityControlInfoSCG-r12             MobilityControlInfoSCG-r12            OPTIONAL,  -- Need ON
    ...,
    [[
    sCellToReleaseListSCG-Ext-r13          SCellToReleaseListExt-r13             OPTIONAL,  --
Need ON
    sCellToAddModListSCG-Ext-r13           SCellToAddModListExt-r13              OPTIONAL  --
Need ON
    ]],
    [[
    sCellToAddModListSCG-Ext-v1370         SCellToAddModListExt-v1370 OPTIONAL   -- Need ON
    ]],
    [[
    pSCellToAddMod-v1440                   PSCellToAddMod-v1440                  OPTIONAL  -- Need ON
    ]]
}
```

TABLE 17

```
SCG-ConfigPartSCG-v12f0 ::=        SEQUENCE {
    pSCellToAddMod-v12f0               PSCellToAddMod-v12f0    OPTIONAL,  -- Need ON
    sCellToAddModListSCG-v12f0         SCellToAddModList-v10l0 OPTIONAL,  -- Need ON
}
SecurityConfigHO ::=               SEQUENCE {
    handoverType                       CHOICE {
        intraLTE                           SEQUENCE {
            securityAlgorithmConfig            SecurityAlgorithmConfig OPTIONAL, -- Cond fullConfig
            keyChangeIndicator                 BOOLEAN,
            nextHopChainingCount               NextHopChainingCount
        },
        interRAT                           SEQUENCE {
            securityAlgorithmConfig            SecurityAlgorithmConfig,
            nas-SecurityParamToEUTRA           OCTET STRING (SIZE(6))
        }
    },
    ...
}
-- ASN1STOP
```

'Group-RNTI' of Table 13 may be defined as shown in Table 18 below. The 'Group-RNTI' may be used to identify a terminal (e.g., PL or SGH) operating in the RRC connected state within a cell of the base station. In addition, 'Group-RNTI' may be used for sidelink communication (e.g., sidelink groupcast communication) within a specific platooning group managed by the PL (e.g., SGH).

TABLE 18

```
-- ASN1START
Group-RNTI ::=      BIT STRING (SIZE (16))
-- ASN1STOP
```

The 'groupcastIdentity' of Table 13 may be defined as shown in Table 19 below. The 'groupcastIdentity' may be used to identify a platooning group managed by the PL.

TABLE 19

```
-- ASN1START
GroupcastIdentity-r16 ::=    BIT STRING (SIZE (xx))
-- ASN1STOP
```

Meanwhile, the PL may receive the message (e.g., RRC connection reconfiguration message) from the base station, and may identify the parameters (e.g., information elements) required for platooning communication included in the received message (S805). For example, the PL may identify the group RNTI, the identifier of the platooning group, the reporting periodicity of the PM(s), and the like included in the message. When the message including the information elements required for platooning communication is received, the PL may determine that the sidelink communication indicated by the sidelink UE information message transmitted in the step S802 is allowed. For example, the PL may determine that the terminal indicated by the sidelink UE information message is allowed to operate as the PL. In addition, the PL may determine that execution of the V2X TM and sidelink service type indicated by the sidelink UE information message is allowed. The PL may notify the group RNTI included in the message to the PM(s) participating in the platooning communication.

The base station may generate allocation information of sidelink resources according to the V2X TM supported by the PL, and may transmit the allocation information of sidelink resources to the PL (S806). The allocation information of sidelink resources may be transmitted to the PL through a combination of one or more of an RRC message, a MAC control element (CE), and downlink control information (DCI). Meanwhile, when the RRC message of the step S804 is an RRC connection reconfiguration message, the allocation information of sidelink resources may be included in the RRC message (e.g., RRC connection reconfiguration message) of the step S804. The RRC message of the step S804 may include parameters for the platooning communication as well as the allocation information of sidelink resources. In this case, the step S806 may be omitted. The allocation information of sidelink resources transmitted in the step S804 may be configured according to the V2X TM supported by the PL.

The PL may receive the allocation information of sidelink resources from the base station, and may perform sidelink communication (e.g., platooning communication) with the PM(s) using the allocation information of sidelink resources (S807).

For example, the PL may generate SCI including information required for sidelink communication, and may transmit the SCI to the PM(s). The SCI (e.g., cyclic redundancy check (CRC) of the SCI) may be scrambled by the group RNTI. The PM(s) may detect the SCI by performing a monitoring operation using the group RNTI, and may identify the information elements included in the SCI. The sidelink communication (e.g., platooning communication) may be performed based on the information elements included in the SCI.

Figure 9:
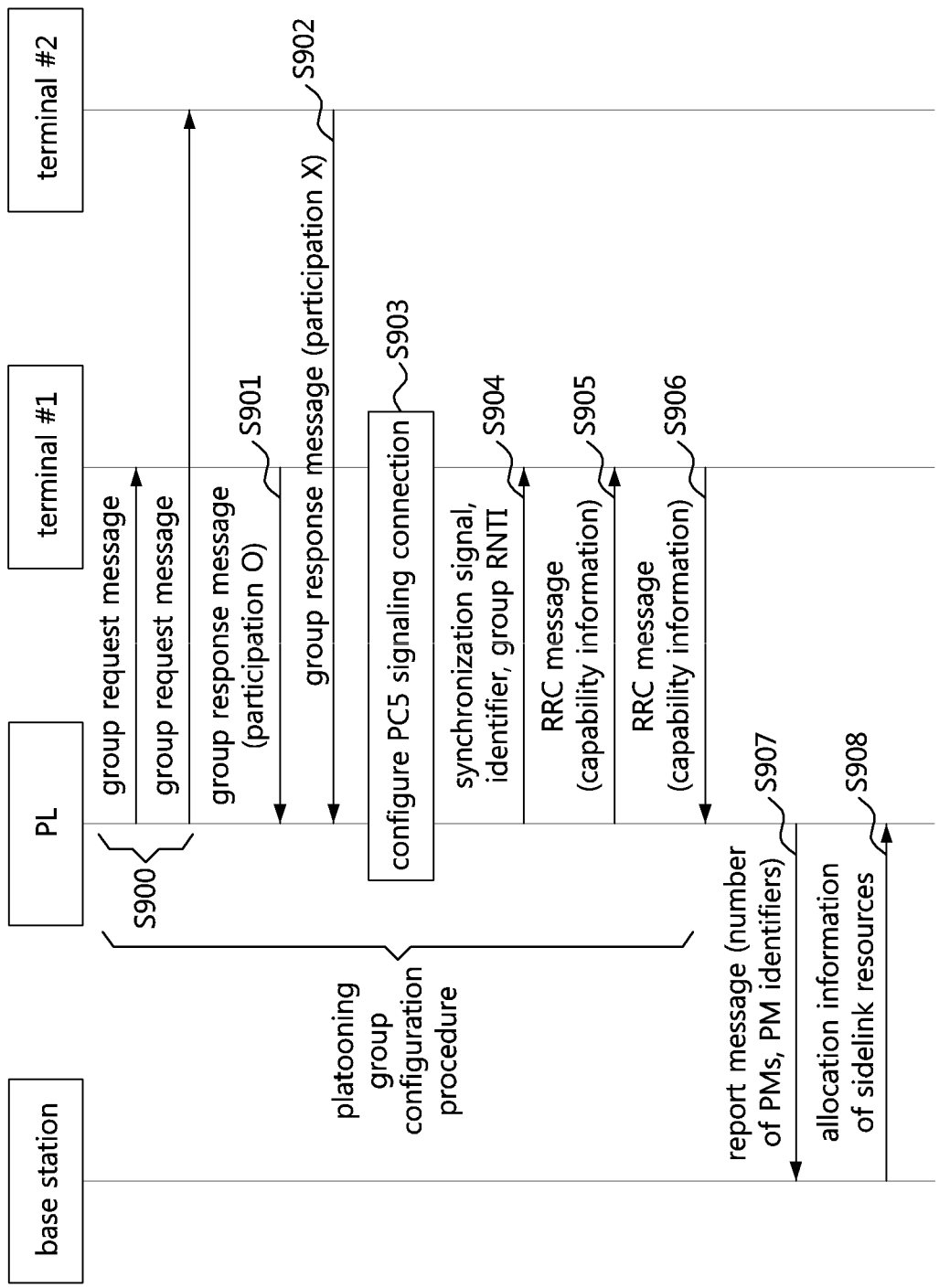
FIG. 9 is a sequence chart illustrating a first exemplary embodiment of a method for reporting platooning group information in a communication system.

FIG. 9 is a sequence chart illustrating a first exemplary embodiment of a method for reporting platooning group information in a communication system.

As shown in FIG. 9, the communication system may include a base station, a PL (e.g., SGH), a terminal #1, and a terminal #2. Each of the base station and the PL shown in FIG. 9 may be the same as the base station and the PL shown in FIG. 8. The terminals #1 and #2 may be terminals located in vehicles adjacent to the PL. A platooning group configuration procedure shown in FIG. 9 may be performed in the step S800 of FIG. 8. Alternatively, the platooning group configuration procedure shown in FIG. 9 may be performed after the step S805 of FIG. 8. When the platooning group configuration procedure is performed both in the step S800 of FIG. 8 and after the step S805 of FIG. 8, the platooning group configuration procedure performed in the step S800 of FIG. 8 may be an initial configuration procedure, and the platooning group configuration procedure performed after the step S805 of FIG. 8 may be a reconfiguration procedure.

The PL may generate a group request message including information indicating that the platooning group (e.g., sidelink groupcast group) exists and information inquiring whether to participate in the platooning group, and transmit the corresponding group request message (S900). The group request message may be transmitted in a broadcast scheme through a sidelink channel, downlink channel, or uplink channel. The group request message may be transmitted based on a PC5 signaling protocol. The terminals #1 and #2 may receive the group request message and may identify the information included in the received group request message.

The terminal #1 may determine to participate in the platooning group indicated by the group request message. In this case, the terminal #1 may generate a group response message including information indicating participation in the platooning group. The group response message may include the identifier of the terminal #1. The terminal #1 may transmit the group response message to the PL (S901). The terminal #2 may determine not to participate in the platooning group indicated by the group request message. In this case, the terminal #2 may generate a group response message including information indicating not to participate in the platooning group. The group response message may include the identifier of the terminal #2. The terminal #2 may transmit the group response message to the PL (S902). Alternatively, when it is determined that the terminal #2 does not participate in the platooning group, the terminal #2 may not transmit a group response message.

The PL may receive the group response message(s) from the terminals #1 and #2, and may identify the information included in the group response message(s). The PL may determine that the terminal #1 participates in the platooning group and may determine that the terminal #2 does not participate in the platooning group. Alternatively, when a group response message is not received from the terminal #2, the PL may determine that the terminal #2 does not participate in the platooning group. The PL may configure a PC5 signaling connection with the terminal #1 participating in the platooning group (S903). In the PC5 signaling connection configuration procedure, RRC signaling messages may be exchanged between the PL and the terminal #1, and the RRC signaling messages may include information elements required for platooning communication (e.g., sidelink groupcast communication).

The PL may transmit a synchronization signal for sidelink communication to the terminal #1 (S904). The synchronization signal may be used to acquire synchronization between the PL and the terminal #1. The synchronization signal may be transmitted through the PC5 signaling connection between the PL and terminal #1. The synchronization signal may be an SS/PBCH block. In this case, the SS/PBCH block may include the identifier of the platooning group and the group RNTI. The identifier of the platooning group may be associated with the group RNTI. Alternatively, a message (e.g., RRC message) including the identifier of the platooning group and the group RNTI may be transmitted to the terminal #1 separately from the synchronization signal. The terminal #1 may receive the synchronization signal from the PL and may synchronize with the PL based on the synchronization signal. In addition, the terminal #1 may obtain the identifier of the platooning group and the group RNTI from the PL.

The PL may transmit capability information of the PL to the terminal #1 (e.g., PM belonging to the platooning group) (S905). The capability information of the PL may be transmitted to the terminal #1 through RRC signaling. The PL RRC message may include one or more information elements defined in Table 20 below (e.g., PL capability information). That is, the RRC message may include not only the capability information of the PL but also other information elements. In Table 20 below, 'group-RNTI' may be the RNTI used for platooning communication, 'groupcastIdentity' may be the identifier of the platooning group managed by the PL, and 'ueCapabilityInformation' may be the capability information of the PL.

TABLE 20

```
-- ASN1START
GroupcastConfigInformation-r16 ::=     SEQUENCE {
    criticalExtensions                 CHOICE {
        c1                             CHOICE {
            groupcastConfigInformation-r16    GroupcastConfigInformation-r16,
            spare3 NULL, spare2 NULL, spare1 NULL
        },
        criticalExtensionsFuture       SEQUENCE { }
    }
}
GroupcastConfigInformation-r16-IEs ::= SEQUENCE {
    group-RNTI                         Group-RNTI
    OPTIONAL,
    groupcastIdentity-r16              GroupcastIdentity-r16       OPTIONAL,
    sl-SSB                             SL-SSB
    OPTIONAL,
    ueCapabilityInformation            UECapabilityInformation-v1250  OPTIONAL,
    nonCriticalExtension               SEQUENCE { }
}
-- ASN1STOP
```

The terminal #1 may receive the RRC message including the information elements defined in Table 20 from the PL, and identify the information elements included in the RRC message (e.g., group RNTI, platooning group identifier, capability information, etc.). The terminal #1 may transmit capability information of the terminal #1 to the PL (S906). The capability information of the terminal #1 may be transmitted to the PL through RRC signaling. The RRC message of the terminal #1 may include one or more information elements defined in Table 21 below. In Table 21 below, 'ueCapabilityInformation' may be the capability information of the terminal #1.

TABLE 21

```
-- ASN1START
GroupcastConfigResponse-r16 ::=      SEQUENCE {
    criticalExtensions                CHOICE {
        c1                             CHOICE {
            groupcastConfigResponse-r16    GroupcastConfigResponse-r16,
            spare3 NULL, spare2 NULL, spare1 NULL
        },
        criticalExtensionsFuture       SEQUENCE { }
    }
}
GroupcastConfigResponse-r16-IEs ::=  SEQUENCE {
    ueCapabilityInformation           UECapabilityInformation-v1250   OPTIONAL,
    nonCriticalExtension              SEQUENCE { }
}
-- ASN1STOP
```

The steps S900 to S906 may be the platooning group configuration procedure. When the platooning group configuration procedure is completed, the terminal #1 may operate as a PM belonging to the platooning group managed by the PL.

Meanwhile, when one or more of the following conditions are satisfied, the PL may transmit a report message including information on the PM(s) belonging to the platooning group managed by the PL to the base station (S907). The step S907 may be performed during the execution of the step S807 shown in FIG. 8.

Condition 1: The reporting periodicity configured by the base station is reached
Condition 2: A new PM joins the platooning group
Condition 3: An existing PM leaves the platooning group The report message may be transmitted to the base station through RRC signaling. The report message may include information indicating the number of the PM(s) belonging to the platooning group managed by the PL and an identifier of each the PM(s). The PM identifiers included in the report message may include an identifier of a new PM joining the platooning group or an identifier of an existing PM leaving the platooning group. The PM identifier may be a ProSe UE ID. The report message may be an RRC message and may include one or more information elements defined in Table 22 below. In Table 22, 'numberofGroupcastMember' may be the number of the PM(s) belonging to the platooning group managed by the PL, and 'GroupcastMember-Identity' may be the identifier of each of the PM(s) belonging to the platooning group managed by the PL. Alternatively, 'GroupcastMember-Identity' may include an identifier of a new PM joining the platooning group or an identifier of an existing PM leaving the platooning group.

The base station may receive the report message from the PL and may identify the information (e.g., the number of PM(s), PM identifiers) included in the report message. The base station may allocate sidelink resources based on the V2X TM supported by the PL and the number of the PM(s) belonging to the platooning group. The base station may transmit allocation information of the sidelink resources to the PL (S908). The allocation information of the sidelink resources may be transmitted to the PL through a combination of one or more of an RRC message, a MAC CE, and DCI. The PL may receive the allocation information of the sidelink resources from the base station, and may perform sidelink communication (e.g., platooning communication) with the PM(s) using the allocation information of the sidelink resources.

Meanwhile, the PL of the platooning group may be changed while the platooning communication is performed. For example, one PM among the PMs belonging to the platooning group may be configured as a new PL. Alternatively, a PL belonging to a specific platooning group may be configured as a new PL of another platooning group. Information indicating that the PL of the platooning group is changed may be transmitted to the base station and/or PM(s). For example, when the PL of the platooning group is changed, the existing PL may transmit information of a new PL (e.g., ProSe UE ID of the new PL) to the base station and/or PM(s). When the PL of the platooning group is changed, the base station may update platooning configuration (e.g., sidelink groupcast configuration) so that the new PL schedules sidelink resources for the PM(s). The PM belonging to the platooning group may update the platooning configuration (e.g., sidelink groupcast configuration) when the PL of the platooning group is changed.

TABLE 22

```
-- ASN1START
GroupcastConfigReport-r16 ::=      SEQUENCE {
    criticalExtensions              CHOICE {
        c1                           CHOICE {
            groupcastConfigReport-r16    GroupcastConfigReport-r16,
            spare3 NULL, spare2 NULL, spare1 NULL
        },
        criticalExtensionsFuture     SEQUENCE { }
    }
}
GroupcastConfigReport-r16-IEs ::= SEQUENCE {
    numberofGroupcastMember-r16      NumberofGroupcastMember-r16   OPTIONAL,
    GroupcastMember-Identity-r16 ProSe UE ID                       OPTIONAL,
    nonCriticalExtension             SEQUENCE { }
}
NumberofGroupcastMember-r16::=     INTEGER (1..xxx)
-- ASN1STOP
```

In addition, the PMs belonging to the platooning group may be changed. For example, a new PM may join the platooning group. Alternatively, an existing PM belonging to the platooning group may leave. In this case, the platooning configuration (e.g., sidelink groupcast configuration) may need to be updated.

Figure 10:
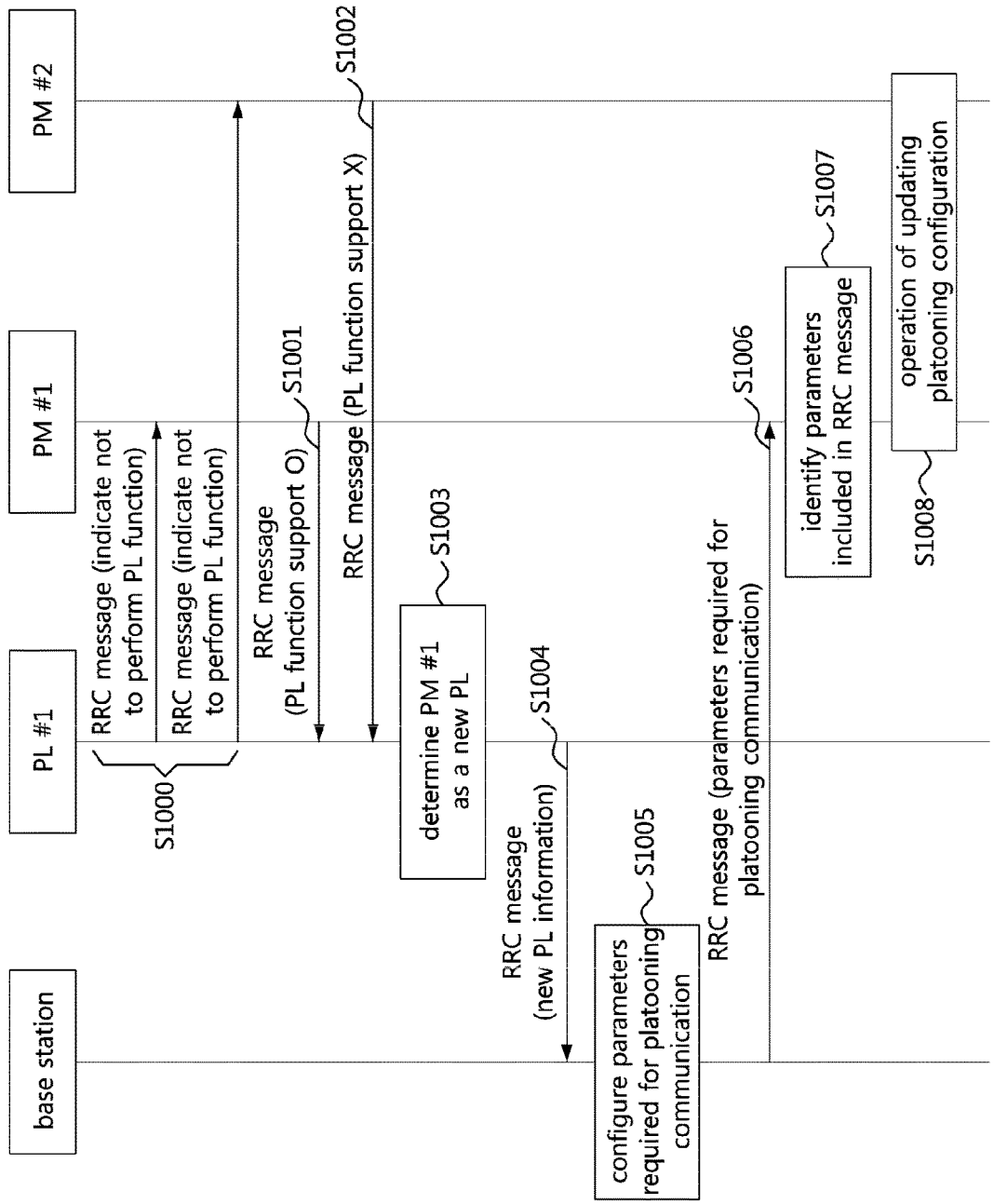
FIG. 10 is a sequence chart illustrating a first exemplary embodiment of a method for updating platooning configuration in Scenario #1.

Scenario #1: When the PL of the platooning group is changed, there is no other PL around the PL FIG. 10 is a sequence chart illustrating a first exemplary embodiment of a method for updating platooning configuration in Scenario #1.

The RRC message generated by the PL #1 may include one or more information elements defined in Table 23 below. In Table 23, 'GroupHeaderChange-Indication' may indicate that the PL #1 does not perform the PL function. For example, if 'GroupHeaderChange-Indication' is present in the RRC message, it may indicate that the PL #1 does not perform the PL function. Alternatively, 'GroupHeaderChange-Indication' set to '0' may indicate that the PL #1 performs the PL function. 'GroupHeaderChange-Indication' set to '1' may indicate that the PL #1 does not perform the PL function.

TABLE 23

```
-- ASN1START
GroupcastConfigInformation-r16 ::=         SEQUENCE {
    criticalExtensions                     CHOICE {
        c1                                     CHOICE {
            groupcastConfigInformation-r16         GroupcastConfigInformation-r16,
            spare3 NULL, spare2 NULL, spare1 NULL
        },
        criticalExtensionsFuture               SEQUENCE { }
    }
}
GroupcastConfigInformation-r16-IEs ::=     SEQUENCE {
    group-RNTI                             Group-RNTI
    OPTIONAL,
    groupcastIdentity-r16                  GroupcastIdentity-r16            OPTIONAL,
    sl-SSB                                 SL-SSB
    OPTIONAL,
    GroupHeaderChange-Indication-r16 ENUMERATED
    {true}                                 OPTIONAL,                         -- Need ON
    ueCapabilityInformation                UECapabilityInformation-v1250    OPTIONAL,
    nonCriticalExtension                   SEQUENCE { }
}
-- ASN1STOP
```

As shown in FIG. 10, the communication system may include a base station, a PL #1, a PM #1, and a PM #2. The PL #1 may be an existing PL that manages a platooning group. The PMs #1 and #2 may belong to the platooning group managed by the PL #1. The exemplary embodiment shown in FIG. 10 may be performed after the exemplary embodiment shown in FIG. 9. The PL #1 of FIG. 10 may be the PL of FIG. 9. In addition, the PL #1 may be an SGH, and each of the PM #1 and the PM #2 may be an SGM.

The PL #1 may determine not to perform a PL function (e.g., SGH function). In this case, the higher layer entity of the PL #1 (e.g., entity performing functions of the V2X layer) may transmit information indicating that the PL #1 does not perform the PL function to the AS layer entity of the PL #1 (e.g., entity performing functions of the AS layer). In addition, the identifier of the platooning group managed by the PL #1 may be transmitted from the higher layer entity to the AS layer entity together with the information indicating that the PL #1 does not perform the PL function.

The PL #1 (e.g., AS layer entity of the PL #1) may generate an RRC message including information indicating that the PL #1 does not perform the PL function. The RRC message may further include an identifier (e.g., ProSe UE ID) of the PL #1 and an identifier of the platooning group managed by the PL #1. The information indicating that the PL #1 does not perform the PL function may be associated with the identifier (e.g., ProSe UE ID) of the PL #1 and/or the identifier of the platooning group managed by the PL #1.

The PL #1 may transmit the RRC message including the information indicating that the PL #1 does not perform the PL function, the identifier of the PL #1, the identifier of the platooning group, and the like to the PMs #1 and #2 belonging to the platooning group managed by the PL #1 (S1000). The PMs #1 and #2 may receive the RRC message from the PL #1, and may identify the information elements included in the RRC message. The AS layer entities of the PMs #1 and #2 may transmit the information indicating that the PL #1 does not perform the PL function to the higher layer entities of the PMs #1 and #2. An operation of transferring the information indicating that the PL #1 does not perform the PL function may be performed between the higher layer entities.

The higher layer entities of the PMs #1 and #2 may transmit information indicating whether the corresponding PMs #1 and #2 support the PL function to the AS layer entities of the PMs #1 and #2. The PMs #1 and #2 (e.g. AS layer entities of the PMs #1 and #2) may generate RRC messages including information indicating whether the corresponding PMs #1 and #2 support the PL function. In addition, the RRC message may include the identifier of the PM(s). Here, the PM #1 may support the PL function, and the PM #2 may not support the PL function. That is, the PM #1 may prefer to operate as a PL, and the PM #2 may not prefer to operate as a PM. The RRC message generated by the PMs #1 and #2 may include one or more information elements listed in Table 24.

TABLE 24

```
-- ASN1START
GroupcastConfigResponse-r16 ::=         SEQUENCE {
    criticalExtensions                  CHOICE {
        c1                                  CHOICE {
            groupcastConfigResponse-r16         GroupcastConfigResponse-r16,
            spare3 NULL, spare2 NULL, spare1 NULL
        },
        criticalExtensionsFuture            SEQUENCE { }
    }
}
GroupcastConfigResponse-r16-IEs ::=     SEQUENCE {
    GroupHeaderPref-Indication-r16          ENUMERATED              {Header,
Member} OPTIONAL,                           -- Need ON
    ueCapabilityInformation                 UECapabilityInformation-v1250  OPTIONAL,
    nonCriticalExtension                    SEQUENCE { }
}
-- ASN1STOP
```

In Table 24, 'GroupHeaderPref-Indication' may indicate whether the PM supports the PL function. For example, if 'GroupHeaderPref-Indication' is present in the RRC message, it may indicate that the PM supports the PL function. That is, 'GroupHeaderPref-Indication' may indicate that the PM prefers to operate as a PL. Alternatively, 'GroupHeaderPref-Indication' set to '0' may indicate that the PM prefers to operate as a PL. 'GroupHeaderPref-Indication' set to '1' may indicate that the PM prefers to operate as a PM.

The PM #1 may transmit the RRC message to the PL #1 (S1001). 'GroupHeaderPref-Indication' included in the RRC message of the PM #1 may indicate that the PM #1 supports the PL function. The PM #2 may transmit the RRC message to the PL #1 (S1002). 'GroupHeaderPref-Indication' included in the RRC message of the PM #2 may indicate that the PM #2 does not support the PL function. The PL #1 may receive the RRC messages from the PMs #1 and #2 and may identify 'GroupHeaderPref-Indication' included in the RRC messages. The PL #1 may determine the PM #1 as a new PL based on the 'GroupHeaderPref-Indication' included in the RRC messages (S1003). When there are a plurality of PMs that prefer to operate as a PL, the PL #1 may determine one PM among the plurality of PMs as a new PL. The operation of selecting a PM to operate as a new PL may be performed through information exchange between the higher layer entity and the AS layer entity of the PL #1.

When the PM to operate as a new PL is determined as the PM #1, the PL #1 may generate an RRC message including information on the new PL (e.g., PM #1). The information on the new PL may be the identifier (e.g., ProSe UE ID) of the PL #1. In addition, the RRC message may further include information indicating a cause for updating the platooning configuration. The cause for updating the platooning configuration may be one of the following reasons.

Cause 1: Change of the PL
Cause 2: A new PM joins the platooning group
Cause 3: An existing PM leaves the platooning group The RRC message generated by the PL #1 may include one or more information elements listed in Table 25 below. In Table 25, 'PriorGroupcastHeader-Identity' may be the identifier of the PL #1 which is the existing PL, 'NewGroupcastHeader-Identity' may be the identifier of the PM #1 which is the new PL, and 'GroupcastConfigUpdateCause' may indicate the cause for updating the platooning configuration. Each of 'PriorGroupcastHeader-Identity' and 'NewGroupcastHeader-Identity' may be a ProSe UE ID. 'GroupcastHeaderChange' may indicate a change of the PL, 'GroupcastMemberJoin' indicate that a new PM joins (e.g., participates), and 'GroupcastMemberLeave' may indicate that an existing PM leaves. Here, 'GroupcastConfigUpdateCause' may indicate 'GroupcastHeaderChange'. 'GroupcastMember-List' may be a list of the PM(s) belonging to the platooning group.

TABLE 25

```
-- ASN1START
GroupcastConfigReport-r16 ::=           SEQUENCE {
    criticalExtensions                  CHOICE {
        c1                                  CHOICE {
            groupcastConfigReport-r16           GroupcastConfigReport-r16,
            spare3 NULL, spare2 NULL, spare1 NULL
        },
        criticalExtensionsFuture            SEQUENCE { }
    }
}
GroupcastConfigReport-r16-IEs ::=       SEQUENCE {
    NewGroupcastHeader-Identity-r16         GroupcastHeader-Identity-r16
    GroupcastConfigUpdateCause-r16          ENUMERATED              {GroupcastHeaderChange,
GroupcastMemberJoin, GroupcastMemberLeave,
                                                    spare2, spare1},
    numberofGroupcastMember-r16             NumberofGroupcastMember-r16    OPTIONAL,
    GroupcastMember-Identity-r16 ProSe UE ID                               OPTIONAL,
    nonCriticalExtension                    SEQUENCE { }
}
NumberofGroupcastMember-r16::=          INTEGER (1..xxx)
-- ASN1STOP
```

The PL #1 may transmit an RRC message including one or more information elements listed in Table 25 to the base station (S1004). The base station may receive the RRC message from the PL #1, and may identify the information elements (e.g., information elements listed in Table 25) included in the RRC message. For example, the base station may determine that the PM #1 operates as a new PL, and may determine the reason why the platooning configuration needs to be updated. When the PM #1 is allowed to operate as a new PL, the base station may configure parameters required for platooning communication (S1005).

For example, the base station may configure a new group RNTI used for the platooning communication managed by the new PL (i.e., PM #1). Since the members of the platooning group are changed due to the PL change, the base station may configure a new group RNTI for the changed members. The new group RNTI may be mapped to the identifier (e.g., ProSe UE ID) of the new PL. In addition, the base station may configure a new identifier of the platooning group, a new reporting periodicity of information on the PM(s) belonging to the platooning group, and the like. The new identifier of the platooning group may be mapped to the new group RNTI.

The base station may generate an RRC message including parameters required for platooning communication, and may transmit the generated RRC message to the new PL (i.e., PM #1) (S1006). In addition, the RRC message generated by the base station may be transmitted to the existing PL (i.e., PL #1). The RRC message generated by the base station may include one or more information elements listed in Tables 9 to 17. 'Group-RNTI' of Table 13 may be defined as shown in Table 18, and 'groupcastIdentity' of Table 13 may be defined as shown in Table 19.

The new PL (i.e., PM #1) may receive the RRC message from the base station, and may identify the information elements included in the RRC message (e.g., information elements defined in Tables 9 to 17) (S1007). The new PL may use the information elements obtained from the base station to update configuration of the platooning group with adjacent terminals (e.g., PM(s) belonging to the existing platooning group) (S1008). The step S1008 may be performed based on a PC5 signaling protocol.

For example, the new PL may transmit information indicating that the PL supporting the same platooning service (e.g., the same sidelink groupcast service) is changed, and identify the PM(s) belonging to the existing platooning group. For example, the new PL may transmit the group request message of the step S900 shown in FIG. 9 to adjacent terminals. The terminals adjacent to the new PL may identify that the PL supporting the same platooning service (e.g., the same sidelink groupcast service) is changed through a PC5 discovery procedure. The adjacent terminals may transmit messages (e.g., group response message in the steps S901 and S902 of FIG. 9) including information indicating whether to participate in the new platooning group to the new PL.

The new PL may receive the messages including information indicating whether to participate in the new platooning group from the adjacent terminals. Thereafter, the operations of the new PL, the adjacent terminal(s), and the base station may be the same as or similar to the operations of the PL, the terminal #1, and the base station in the steps S903 to S908 shown in FIG. 9. For example, when the new PL performs the step S905, the new PL may transmit an RRC message including one or more information elements listed in Table 23 (e.g., capability information of the new PL) to the adjacent terminal(s) (e.g., PM #2).

When the adjacent terminal(s) perform the step S906, the adjacent terminal(s) may transmit an RRC message(s) including one or more information elements (e.g., capability information of the terminal(s)) listed in Table 24 to the new PL. When the new PL performs the step S907, the new PL may transmit a report message including one or more information elements (e.g., PM identifier, number of PMs) listed in Table 25 to the base station.

Scenario #2: When the PL of the platooning group is changed, there is other PL around the PL FIG. 11 is a sequence chart illustrating a first exemplary embodiment of a method for updating platooning configuration in Scenario #2.

Figure 11:
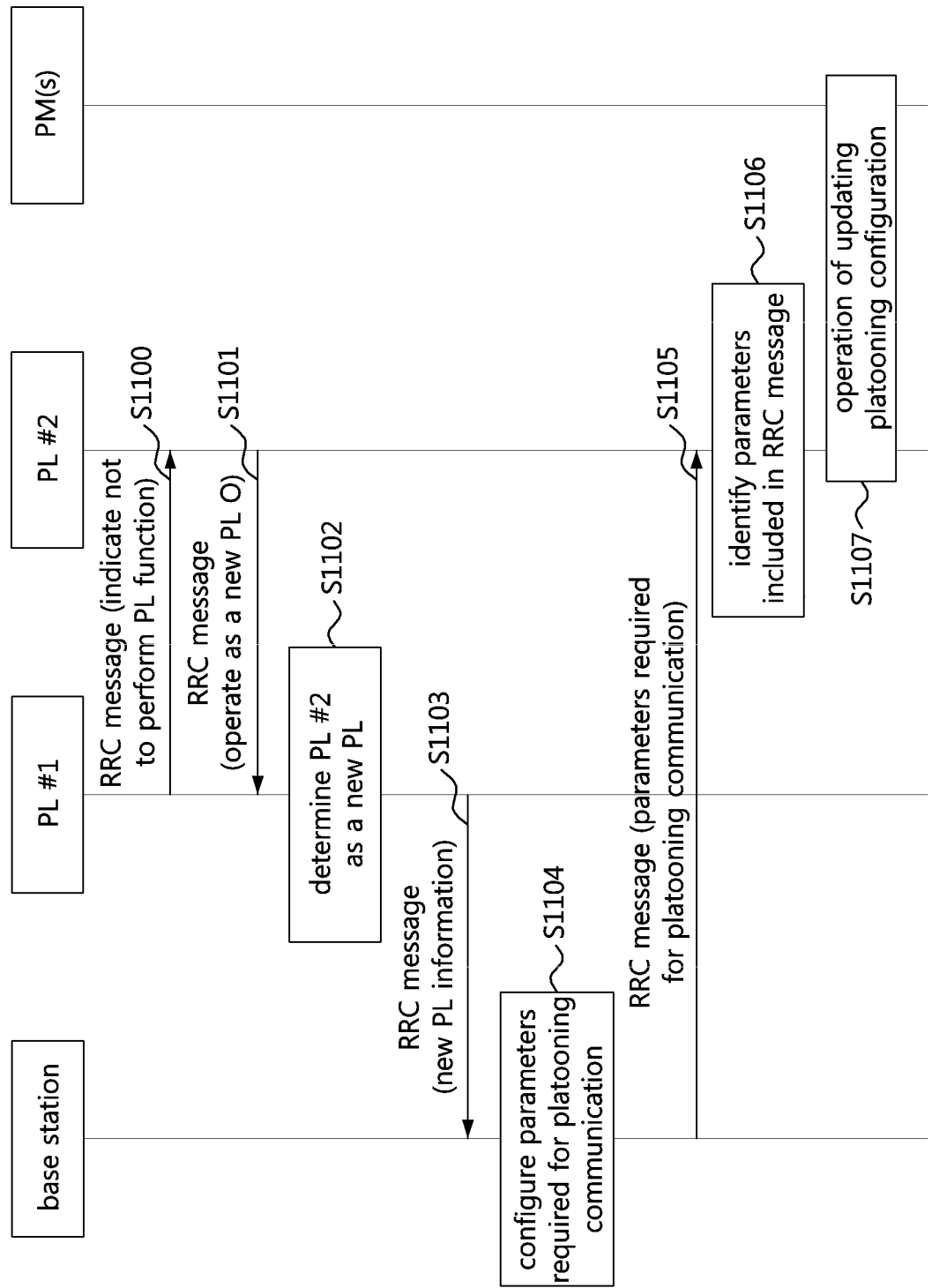
FIG. 11 is a sequence chart illustrating a first exemplary embodiment of a method for updating platooning configuration in Scenario #2.

As shown in FIG. 11, the communication system may include a base station, a PL #1, a PL #2, and PM(s). A platooning group may include the PL #1 and the PM(s). The PL #1 may be an existing PL that manages the platooning group. The platooning group managed by the PL #1 may be different from a platooning group managed by the PL #2. The exemplary embodiment shown in FIG. 11 may be performed after the exemplary embodiment shown in FIG. 9. The PL #1 of FIG. 11 may be the PL of FIG. 9. In addition, each of the PL #1 and the PL #2 may be an SGH, and the PM(s) may be SGM(s).

The PL #1 may determine not to perform the PL function. In this case, the PL #1 may transmit information (e.g., ProSe UE ID) of a new PL (e.g., PL #2) to the PM(s) belonging to the platooning group. For example, the higher layer entity of the PL #1 may transmit information indicating that the PL #1 does not perform the PL function to the AS layer entity of the PL #1. In addition, the identifier of the platooning group managed by the PL #1 may be transmitted from the higher layer entity to the AS layer entity together with the information indicating that the PL #1 does not perform the PL function.

The PL #1 (e.g., AS layer entity of the PL #1) may generate an RRC message including the information indicating that the PL #1 does not perform the PL function. The RRC message may further include the identifier of the PL #1 (e.g., ProSe UE ID) and the identifier of the platooning group managed by the PL #1. The information indicating that the PL #1 does not perform the PL function may be associated with the identifier of the PL #1 (e.g., ProSe UE ID) and/or the identifier of the platooning group managed by the PL #1. The RRC message generated by the PL #1 may include one or more information elements listed in Table 23.

The PL #1 may transmit the RRC message including the information indicating that the PL #1 does not perform the PL function, the identifier of the PL #1, the identifier of the platooning group, and the like. The platooning group managed by the PL #1 may be different from the platooning group managed by the PL #2. The PL #2 may receive the RRC message from the PL #1, and may identify the information elements included in the RRC message. The AS layer entity of the PL #2 may transmit information indicating that the PL #1 does not perform the PL function to the higher layer entity of the PL #2. The operation of transferring the information indicating that the PL #1 does not perform the PL function may be performed between the higher layer entities.

The higher layer entity of the PL #2 may transmit information indicating whether the PL #2 can operate as a new PL for the platooning group of the PL #1 to the AS layer entity of the PL #2. The PL #2 (e.g., AS layer entity of the PL #2) may generate an RRC message including information indicating whether the PL #2 can operate as a new PL for the platooning group of the PL #1. The RRC message may indicate that the PL #2 can operate as a new PL for the platooning group of the PL #1. In addition, the RRC message may further include the identifier (e.g., ProSe UE ID) of the PL #2 and the identifier of the platooning group managed by the PL #2. The information indicating whether the PL #2 can operate as a new PL for the platooning group of the PL #1 may be associated with the identifier of the PL #2 and/or the identifier of the platooning group managed by the PL #2.

The RRC message generated by the PL #2 may include one or more information elements listed in Table 24. In Table 24, 'GroupHeaderPref-Indication' may indicate that the PL #2 can operate as a new PL for the platooning group of the PL #1, and 'GroupcastHeader-Identity' may be the identifier of the PL #2. 'groupcastIdentity' may be the identifier of the platooning group managed by the PL #2 or the identifier of the platooning group managed by the PL #1.

The PL #2 may transmit the RRC message including one or more information elements shown in Table 24 to the PL #1 (S1101). The PL #1 may receive the RRC message from the PL #2, and may identify 'GroupHeaderPref-Indication' included in the RRC message. The PL #1 may determine the PL #2 as a new PL based on 'GroupHeaderPref-Indication' included in the RRC message (S1102). When a plurality of PLs capable of operating as a new PL for the platooning group of the PL #1 exist, the PL #1 may determine one PL from among the plurality of PLs as a new PL. The operation of selecting a new PL may be performed through information exchange between the higher layer entity and the AS layer entity of the PL #1.

When the PL #2 is determined as a new PL, the PL #1 may generate an RRC message including information on the new PL (e.g., PL #2). The information on the new PL may be the identifier (e.g., ProSe UE ID) of the PL #2. In addition, the RRC message may further include information indicating a cause for updating the platooning configuration. The cause for updating the platooning configuration may be one of the following reasons.

Cause 1: Change of the PL
Cause 2: A new PM joins the platooning group
Cause 3: An existing PM leaves the platooning group The RRC message generated by the PL #1 may include one or more information elements listed in Table 25 below. In Table 25, "PriorGroupcastHeader-Identity" may be the identifier of the PL #1 which is the existing PL, 'NewGroupcastHeader-Identity' may be the identifier of the PL #2 which is the new PL, and 'GroupcastConfigUpdateCause' may indicate the cause for updating the platooning configuration. Each of 'PriorGroupcastHeader-Identity' and 'NewGroupcastHeader-Identity' may be a ProSe UE ID. Here, 'GroupcastConfigUpdateCause' may indicate 'GroupcastHeaderChange'.

The PL #1 may transmit the RRC message including one or more information elements listed in Table 25 to the base station (S1103). The base station may receive the RRC message from the PL #1, and may identify the information elements (e.g., information elements listed in Table 25) included in the RRC message. For example, the base station may determine that the PL #2 operates as a new PL, and may determine the reason why the platooning configuration needs to be updated. When the PL #2 is allowed to operate as the new PL, the base station may configure parameters required for platooning communication (S1104).

For example, the base station may configure a new group RNTI used for the platooning communication managed by the new PL (i.e., PL #2). Since the members of the platooning groups (e.g., members of the platooning groups managed respectively by the PL #1 and the PL #2) are changed due to the PL change, the base station may configure a new group RNTI for the changed members. The new group RNTI may be mapped to the identifier (e.g., ProSe UE ID) of the new PL. In addition, the base station may configure a new identifier of the platooning group, a new reporting periodicity of information on the PM(s) belonging to the platooning group, and the like. The new identifier of the platooning group may be mapped to the new group RNTI.

The base station may generate an RRC message including parameters required for platooning communication, and may transmit the generated RRC message to the PL #2 (i.e., new PL) (S1105). In addition, the RRC message generated by the base station may be transmitted to the PL #1 (i.e., the existing PL). The RRC message generated by the base station may include one or more information elements listed in Tables 9 to 17. 'Group-RNTI' of Table 13 may be defined as shown in Table 18, and 'groupcastIdentity' of Table 13 may be defined as shown in Table 19.

The PL #2 may receive the RRC message from the base station, and may identify the information elements included in the RRC message (e.g., information elements defined in Tables 9 to 17) (S1106). The PL #2 may use the information elements obtained from the base station to update configuration of the platooning group with adjacent terminals (e.g., PM(s) belonging to the platooning group managed by the PL #1) (S1107). The step S1107 may be performed based on a PC5 signaling protocol.

For example, the PL #2 may transmit information indicating that the PL supporting the platooning service is changed, and identify the PM(s) belonging to the existing platooning group. For example, the PL #2 may transmit the group request message of the step S900 shown in FIG. 9 to adjacent terminals. The terminals adjacent to the PL #2 may identify that the PL supporting the platooning service is changed through a PC5 discovery procedure. The adjacent terminals may transmit messages (e.g., group response message in the steps S901 and S902 of FIG. 9) including information indicating whether to participate in the new platooning group to the PL #2 (i.e., the new PL).

The PL #2 may receive the messages including information indicating whether to participate in the new platooning group from the adjacent terminals. Thereafter, the operations of the PL #2, the adjacent terminal(s), and the base station may be the same as or similar to the operations of the PL, the terminal #1, and the base station in the steps S903 to S908 shown in FIG. 9. For example, when the PL #2 performs the step S905, the PL #2 may transmit an RRC message including one or more information elements listed in Table 23 (e.g., capability information of the new PL) to the adjacent terminal(s) (e.g., PM #2).

When the adjacent terminal(s) perform the step S906, the adjacent terminal(s) may transmit an RRC message(s) including one or more information elements (e.g., capability information of the terminal(s)) listed in Table 24 to the PL #2. In addition, when the PL #2 performs the step S907, the PL #2 may transmit a report message including one or more information elements (e.g., PM identifier, number of PMs) listed in Table 25 to the base station.

Scenario #3: An existing PM leaves the platooning group.

Figure 12:
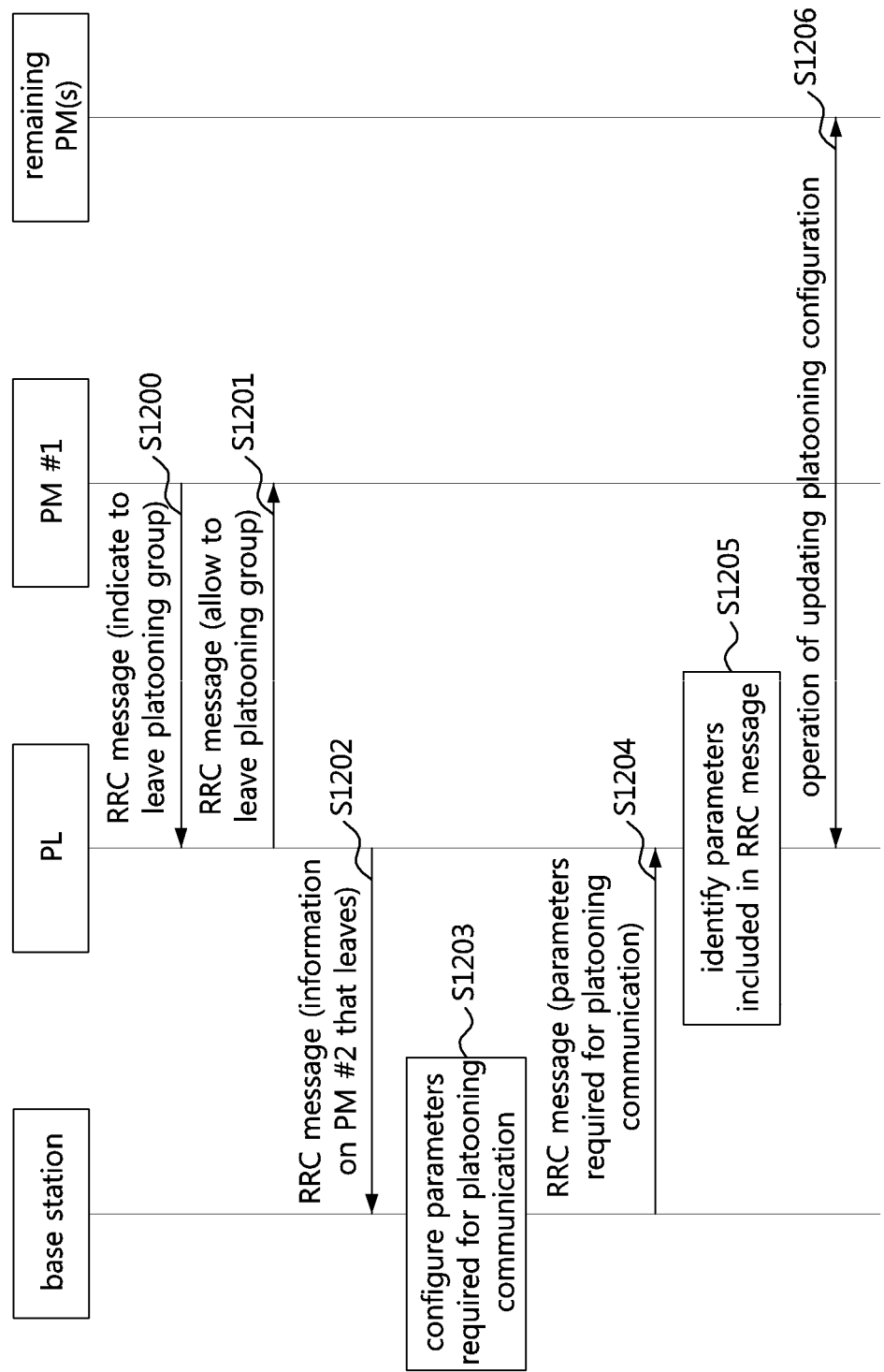
FIG. 12 is a sequence chart illustrating a first exemplary embodiment of a method for updating platooning configuration in Scenario #3.

FIG. 12 is a sequence chart illustrating a first exemplary embodiment of a method for updating platooning configuration in Scenario #3.

As shown in FIG. 12, the communication system may include a base station, a PL, a PM #1, and remaining PM(s). A platooning group may include the PL, PM #1, and remaining PM(s). The exemplary embodiment shown in FIG. 12 may be performed after the exemplary embodiment shown in FIG. 9. The PL #1 of FIG. 12 may be the PL of FIG. 9. In addition, the PL may be an SGH, and the PM #1 and the remaining PM(s) may be SGM(s).

The PM #1 may determine to leave the platooning group managed by the PL. In this case, the higher layer entity of the PL #1 may transmit information indicating that the PM #1 leaves the platooning group to the AS layer entity of the PM #1. In addition, the identifier of the platooning group to which the PM #1 belongs may be transmitted from the higher layer entity to the AS layer entity together with the information indicating that the PM #1 leaves the platooning group.

The PM #1 (e.g., AS layer entity of the PM #1) may generate an RRC message including information indicating that the PM #1 leaves the platooning group. The RRC message may further include the identifier (e.g., ProSe UE ID) of the PM #1 and the identifier of the platooning group to which the PM #1 belongs. The information indicating that the PM #1 leaves the platooning group may be associated with the identifier (e.g., ProSe UE ID) of the PM #1 and/or the identifier of the platooning group to which the PM #1 belongs. The RRC message generated by the PM #1 may include one or more information elements listed in Table 26 below. In Table 26, 'GroupcastMember-Identity' may be the identifier of the PM #1. 'GroupMemberPref-Indication' set to 'Leave' in Table 26 may indicate that the PM #1 indicated by 'GroupcastMember-Identity' leaves the platooning group indicated by 'groupcastIdentity'. In Table 26, 'ProSe UE ID' may be defined as shown in Table 8.

platooning group, and the like to the PL (e.g., PL managing the platooning group to which the PM #1 belongs) (S1200). The PL may receive the RRC message from the PM #1 and may identify the information elements included in the RRC message. The AS layer entity of the PL may transmit information indicating that the PM #1 leaves the platooning group to the higher layer entity of the PL. The transmission of the information indicating that the PM #1 leaves the platooning group may be performed between the higher layer entities.

The higher layer entity of the PL may transmit information indicating whether the PM #1 is allowed to leave the platooning group to the AS layer entity of the PL. The PL (e.g., AS layer entity of the PL) may generate an RRC message including information indicating whether the PM #1 is allowed to leave the platooning group. The RRC message may indicate that the PM #1 is allowed to leave the platooning group. In addition, the RRC message may further include the identifier (e.g., ProSe UE ID) of the PM #1 and the identifier of the platooning group to which the PM #1 belongs. The information indicating that the PM #1 is allowed to leave the platooning group may be associated with the identifier of the PM #1 and/or the identifier of the platooning group to which the PM #1 belongs.

The RRC message generated by the PL may include one or more information elements listed in Table 27. 'GroupMemberChange-Indication' set to 'Accept' in Table 27 may indicate that PM #1 indicated by 'GroupcastMember-Identity' is allowed to leave the platooning group indicated by 'groupcastIdentity'. 'GroupMemberChange-Indication' set

TABLE 26

```
-- ASN1START
GroupcastConfigInformation-r16 ::=      SEQUENCE {
    criticalExtensions                  CHOICE {
        c1                                  CHOICE {
            groupcastConfigInformation-r16     GroupcastConfigInformation-r16,
            spare3 NULL, spare2 NULL, spare1 NULL
        },
        criticalExtensionsFuture        SEQUENCE { }
    }
}
GroupcastConfigInformation-r16-IEs ::=  SEQUENCE {
    group-RNTI                          Group-RNTI
OPTIONAL,
    groupcastIdentity-r16               GroupcastIdentity-r16           OPTIONAL,
    sl-SSB                              SL-SSB
OPTIONAL,
    GroupHeaderChange-Indication-r16    ENUMERATED
{true}                                  OPTIONAL,                       -- Need ON
    ueCapabilityInformation             UECapabilityInformation-v1250   OPTIONAL,
    nonCriticalExtension                SEQUENCE { }
}
-- ASN1STOP
```

The PM #1 may transmit the RRC message including the information indicating that the PM #1 leaves the platooning group, the identifier of the PM #1, the identifier of the to 'Deny' in Table 27 may indicate that the PM indicated by 'GroupcastMember-Identity' is not allowed to leave the platooning group indicated by 'groupcastIdentity'.

TABLE 27

```
-- ASN1START
GroupcastConfigResponse-r16 ::=     SEQUENCE {
    criticalExtensions                  CHOICE {
        c1                                  CHOICE {
            groupcastConfigResponse-r16        GroupcastConfigResponse-r16,
            spare3 NULL, spare2 NULL, spare1 NULL
        },
        criticalExtensionsFuture        SEQUENCE { }
    }
}
```

TABLE 27-continued

```
}
GroupcastConfigResponse-r16-IEs ::=      SEQUENCE {
    GroupHeaderPref-Indication-r16           ENUMERATED              {Header,
Member}  OPTIONAL,                           -- Need ON
    ueCapabilityInformation                  UECapabilityInformation-v1250  OPTIONAL,
    nonCriticalExtension                     SEQUENCE { }
}
-- ASN1STOP
```

The PL may transmit the RRC message to the PM #1 (S1201). The PM #1 may receive the RRC message from the PL and may identify 'GroupMemberChange-Indication' included in the RRC message. The PM #1 may identify whether the PM #1 is allowed to leave the platooning group based on 'GroupMemberChange-Indication' included in the RRC message. When 'GroupMemberChange-Indication' is set to 'Accept', the PM #1 may determine that the PM #1 is allowed to leave the platooning group.

When the PM #1 is determined to leave the driving group, the PL may generate an RRC message including information on the PM #1. The RRC message may indicate that the platooning group is changed. The information on the PM #1 may be the identifier (e.g., ProSe UE ID) of the PM #1. In addition, the RRC message may further include information indicating a cause for updating the platooning configuring. The cause for updating the platooning configuration may be one of the following reasons.

Cause 1: Change of the PL
Cause 2: A new PM joins the platooning group
Cause 3: An existing PM leaves the platooning group The RRC message generated by the PL may include one or more information elements listed in Table 25. In Table 25, 'GroupcastConfigUpdateCause' may be set to 'Groupcast-MemberLeave'. That is, 'GroupcastConfigUpdateCause' may indicate that the PM #1 indicated by 'GroupcastMember-Identity' leaves the platooning group.

The PL may transmit the RRC message including one or more information elements listed in Table 25 to the base station (S1202). The base station may receive the RRC message from the PL, and may identify information elements (e.g., information elements listed in Table 25) included in the RRC message. For example, the base station may identify that the PM #1 leaves the platooning group managed by the PL. In this case, the base station may configure parameters required for platooning communication (S1203).

For example, the base station may configure a new group RNTI used for platooning communication managed by the PL. Since the members of the platooning group are changed due to the leaving of the PM #1, the base station may configure a new group RNTI for the changed members. The new group RNTI may be mapped to the identifier (e.g., ProSe UE ID) of the PL. In addition, the base station may configure a new identifier of the platooning group, a new reporting periodicity of information on the PM(s) belonging to the platooning group, and the like. The new identifier of the platooning group may be mapped to the new group RNTI.

The base station may generate an RRC message including parameters required for platooning communication, and may transmit the generated RRC message to the PL (S1204). The RRC message generated by the base station may include one or more of the information elements listed in Tables 9 to 17.

'Group-RNTI' of Table 13 may be defined as shown in Table 18, and 'groupcastIdentity' of Table 13 may be defined as shown in Table 19

The PL may receive the RRC message from the base station and may identify information elements (e.g., information elements listed in Tables 9 to 17) included in the RRC message (S1205). The PL may transmit configuration information for platooning communication (e.g., information included in the RRC message received in S1205) to the remaining PM(s) belonging to the platooning group. That is, the PL may update the platooning configuration with the remaining PM(s) belonging to the platooning group (S1206).

Scenario #4: A new terminal joins the platooning group.

Figure 13:
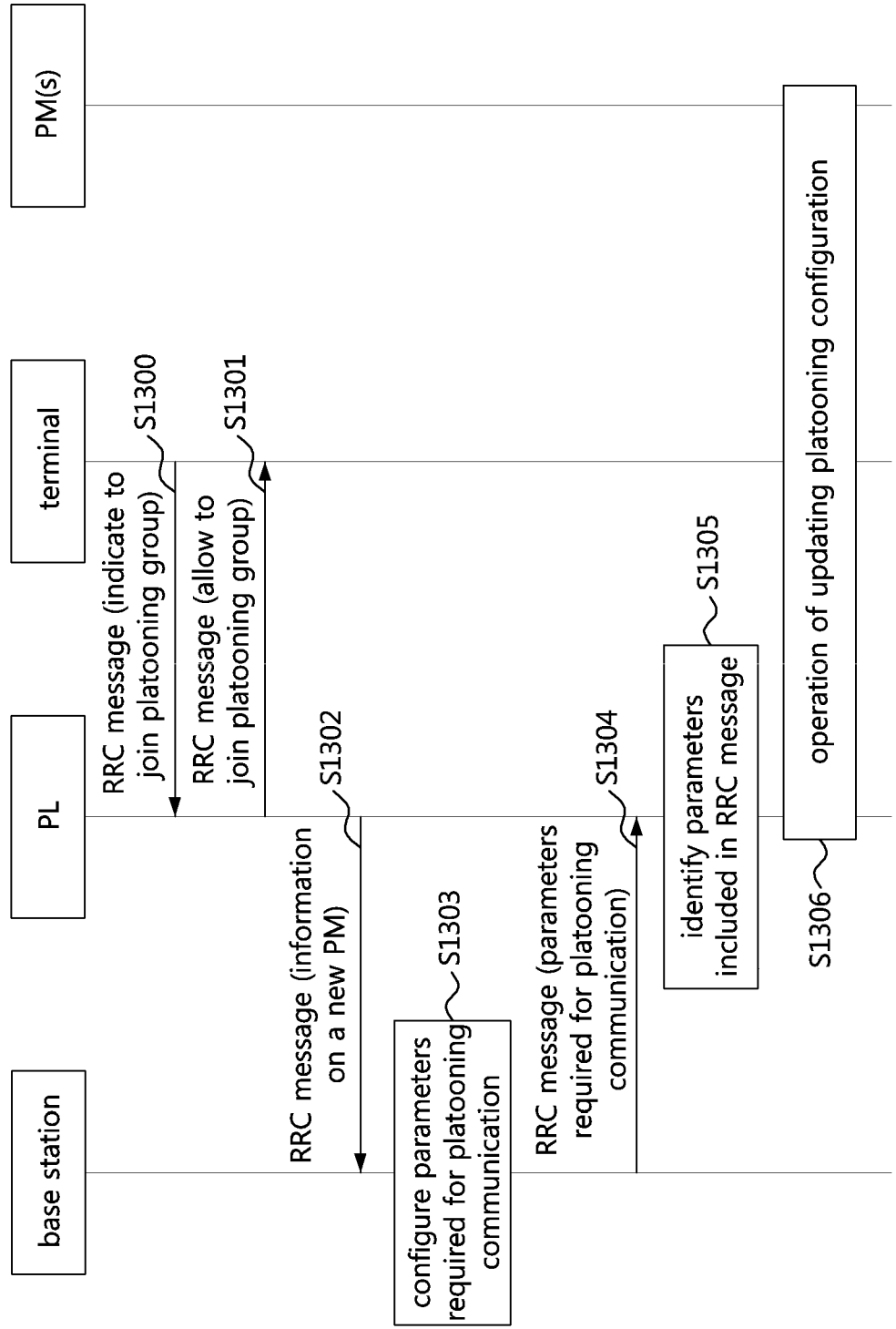
FIG. 13 is a sequence chart illustrating a first exemplary embodiment of a method for updating platooning configuration in Scenario #4.

FIG. 13 is a sequence chart illustrating a first exemplary embodiment of a method for updating platooning configuration in Scenario #4.

As shown in FIG. 13, the communication system may include a base station, a PL, a terminal, and PM(s). A platooning group may include the PL and the PM(s). The exemplary embodiment shown in FIG. 13 may be performed after the exemplary embodiment shown in FIG. 9. The PL #1 of FIG. 13 may be the PL of FIG. 9. In addition, the PL may be a SGH and the PM(s) may be SGM(s). The terminal may decide to join the platooning group managed by the PL. In this case, the higher layer entity of the terminal may transmit information indicating that the terminal joins the platooning group to the AS layer entity of the terminal.

The terminal (e.g., AS layer entity of the terminal) may generate an RRC message including information indicating that the terminal joins the platooning group. The RRC message may further include the identifier (e.g., ProSe UE ID) of the terminal. The information indicating that the terminal joins the platooning group may be associated with the identifier (e.g., ProSe UE ID) of the terminal. The RRC message generated by the terminal may include one or more information elements listed in Table 26. In Table 26, 'Group-castMember-Identity' may be the identifier of the terminal. In Table 26, 'GroupMemberPref-Indication' set to 'Join' may indicate that the terminal indicated by 'GroupcastMember-Identity' joins the platooning group. In Table 26, 'ProSe UE ID' may be defined as shown in Table 8.

The terminal may transmit to the PL the RRC message including the information indicating that the terminal joins the platooning group and the identifier of the terminal (S1300). The PL may receive the RRC message from the terminal and may identify the information elements included in the RRC message. The AS layer entity of the PL may transmit information indicating that the terminal joins the platooning group to the higher layer entity of the PL. The operation of transferring the information indicating that the terminal joins the platooning group may be performed between the higher layer entities.

The higher layer entity of the PL may transmit information indicating whether the terminal is allowed to join the platooning group to the AS layer entity of the PL. The PL (e.g., AS layer entity of the PL) may generate an RRC message including information indicating whether the terminal is allowed to join the platooning group. The RRC message may indicate that the terminal is allowed to join the platooning group. In addition, the RRC message may further include the identifier of the terminal (e.g., ProSe UE ID) and the identifier of the platooning group to which the terminal belongs. The information indicating that the terminal is allowed to join the platooning group may be associated with identifier of the terminal and/or the identifier of the platooning group to which the terminal belongs.

The RRC message generated by the PL may include one or more information elements listed in Table 27. 'GroupMemberChange-Indication' set to 'Accept' in Table 27 may indicate that the terminal indicated by 'GroupcastMember-Identity' is allowed to join the platooning group indicated by 'groupcastIdentity'. 'GroupMemberChange-Indication' set to 'Deny' in Table 27 may indicate that the terminal indicated by 'GroupcastMember-Identity' is not allowed to join the platooning group indicated by 'groupcastIdentity'.

The PL may transmit the RRC message to the terminal (S1301). The terminal may receive the RRC message from the PL and may identify 'GroupMemberChange-Indication' included in the RRC message. The terminal may identify whether the terminal is allowed to join the platooning group based on 'GroupMemberChange-Indication' included in the RRC message. When 'GroupMemberChange-Indication' is set to 'Accept', the terminal may determine that the terminal is allowed to join the platooning group.

When it is determined that the terminal joins the platooning group, the PL may generate an RRC message including information on the terminal (e.g., information on a new PM). The RRC message may indicate that the platooning group is changed. The information on the terminal may be the identifier (e.g., ProSe UE ID) of the terminal. In addition, the RRC message may further include information indicating a cause for updating the platooning configuration. The cause for updating the platooning configuration may be one of the following reasons.

Cause 1: Change of the PL
Cause 2: A new PM joins the platooning group
Cause 3: An existing PM leaves the platooning group The RRC message generated by the PL may include one or more information elements listed in Table 25. In Table 25, 'GroupcastConfigUpdateCause' may be set to 'GroupcastMemberJoin'. That is, 'GroupcastConfigUpdateCause' may indicate that the terminal (i.e., new PM) indicated by 'GroupcastMember-Identity' joins the platooning group.

The PL may transmit the RRC message including one or more information elements listed in Table 25 to the base station (S1302). The base station may receive the RRC message from the PL, and may identify the information elements (e.g., information elements listed in Table 25) included in the RRC message. For example, the base station may determine that the terminal (i.e., new PM) joins the platooning group managed by the PL. In this case, the base station may configure parameters required for platooning communication (S1303).

For example, the base station may configure a new group RNTI used for platooning communication managed by the PL. Since the members of the platooning group change due to the joining of the terminal (i.e., new PM), the base station may configure a new group RNTI for the changed members. The new group RNTI may be mapped to the identifier of the PL (e.g., ProSe UE ID). In addition, the base station may configure a new identifier of the platooning group, a new reporting periodicity of information on PM(s) belonging to the platooning group, and the like. The new identifier of the platooning group may be mapped to the new group RNTI.

The base station may generate an RRC message including parameters required for platooning communication, and may transmit the generated RRC message to the PL (S1304). The RRC message generated by the base station may include one or more of the information elements listed in Tables 9 to 17. 'Group-RNTI' of Table 13 may be defined as shown in Table 18, and 'groupcastIdentity' of Table 13 may be defined as shown in Table 19.

The PL may receive the RRC message from the base station and may identify information elements (e.g., information elements listed in Tables 9 to 17) included in the RRC message (S1305). The PL may transmit configuration information for platooning communication (e.g., information included in the RRC message received in S1305) to the terminal (i.e., new PM) and the PM(s) belonging to the platooning group. That is, the PL may perform the operation of updating the platooning configuration with the terminal and the PM(s) belonging to the platooning group (S1306).

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

What is claimed is:

1. An operation method of a sidelink groupcast header (SGH) managing a sidelink groupcast (SG) group in a communication system, the operation method comprising:
    determining a transmission mode (TM) for communication with one or more sidelink groupcast members (SGMs) belonging to the SG group;
    transmitting a message including the TM to a base station connected to the SGH;
    receiving a group radio network temporary identifier (RNTI) configured for the SG group from the base station;
    receiving configuration information of sidelink resources allocated according to the TM from the base station;
    transmitting sidelink control information (SCI) with a cyclic redundancy check (CRC) scrambled by the group RNTI to the one or more SGMs; and
    performing sidelink groupcast communication with the one or more SGMs based on the sidelink resources allocated by the base station and information included in the SCI, wherein the group RNTI is used for sidelink groupcast communication between the SGH and the one or more SGMs belonging to the SG group, the group RNTI is associated with an identifier of the SG group, and the group RNTI is reconfigured based on a new SGM joining the SG group or based on at least one SGM of the one or more SGMs belonging to the SG group leaving the SG group.

2. The operation method according to claim 1, wherein the TM determined by the SGH is one TM selected from TMs #1 to #4, the TM #1 indicates that the SGH autonomously selects sidelink resources, the TM #2 indicates that the SGH supports selection of sidelink resources for the one or more SGMs, the TM #3 indicates that the SGH uses sidelink resources configured by a configured grant (CG), and the TM #4 indicates that the SGH performs a scheduling operation for communication with the one or more SGMs.

3. The operation method according to claim 1, wherein the message is a sidelink user equipment (UE) information message, the sidelink UE information message includes a sidelink service type, information indicating that the SGH operates as a platooning leader (PL), and an identifier of the SGH, and the sidelink service type indicates at least one of a broadcast service, a multicast service, a groupcast service, and a unicast service.

4. The operation method according to claim 1, wherein in a connection establishment procedure between the SGH and the one or more SGMs, the group RNTI, capability information of the SGH, and capability information of the one or more SGMs are exchanged.

5. The operation method according to claim 1, further comprising:
    reporting information on the one or more SGMs included in the SG group to the base station.

6. The operation method according to claim 5, wherein the information on the one or more SGMs is reported according to a reporting periodicity indicated by the message or when members of the SG group are changed.

7. The operation method according to claim 5, wherein the information on the one or more SGMs includes information indicating a number of the one or more SGMs and an identifier of each of the one or more SGMs.

\* \* \* \* \*